United States Patent
Palumbo

(10) Patent No.: US 11,148,863 B2
(45) Date of Patent: Oct. 19, 2021

(54) APPARATUS AND METHOD FOR VACUUM SKIN PACKAGING OF A PRODUCT

(71) Applicant: CRYOVAC, LLC, Charlotte, NC (US)

(72) Inventor: Riccardo Palumbo, Arona (IT)

(73) Assignee: Cryovac, LLC, Charlotte, NC (US)

( * ) Notice: Subject to any disclaimer, the term of this patent is extended or adjusted under 35 U.S.C. 154(b) by 28 days.

(21) Appl. No.: 16/245,827

(22) Filed: Jan. 11, 2019

(65) Prior Publication Data

US 2019/0185236 A1    Jun. 20, 2019

Related U.S. Application Data

(63) Continuation of application No. 14/436,790, filed as application No. PCT/EP2013/071704 on Oct. 17, 2013, now Pat. No. 10,220,994.

(30) Foreign Application Priority Data

Oct. 19, 2012    (EP) .................................. 12189327

(51) Int. Cl.
    *B65D 75/30*    (2006.01)
    *B65B 31/08*    (2006.01)
    (Continued)

(52) U.S. Cl.
    CPC ............ *B65D 75/305* (2013.01); *B65B 9/045* (2013.01); *B65B 11/52* (2013.01); *B65B 31/00* (2013.01);
(Continued)

(58) Field of Classification Search
CPC ..... B29C 65/18; B29C 65/28; B29C 65/2857; B29C 66/112; B29C 66/131; B29C 66/24244; B29C 66/53461; B29C 66/72341; B29C 66/7392; B29C 66/8322; B29C 66/8324; B29C 66/849; B29C 69/005; B29C 65/78; B29C 65/7847; B65D 1/34; B65D 1/36; B65D 5/24; B65D 75/30; B65D 75/305; B65D 81/20; B65D 81/2038; B65D 81/34
(Continued)

(56) References Cited

U.S. PATENT DOCUMENTS 2,435,878 A * 2/1948 Dunning ........... B29C 66/82661
                                                         206/524.8
3,481,101 A   12/1969 Steadman
(Continued)

FOREIGN PATENT DOCUMENTS

DE          7807446 U1    8/1978
DE    202004020968 U1    6/2006
(Continued)

*Primary Examiner* — Bryon P Gehman
(74) *Attorney, Agent, or Firm* — Jon M. Isaacson

(57) ABSTRACT

A method and apparatus can be used for vacuum skin packaging of a product. The product can be arranged on a support comprising providing a film sheet above the support with the product being arranged between the support and the film sheet. The film sheet can be air tightly fixed to the support. The wall of the support can be perforated to form at least one through hole. At least a portion of air from within the support underneath the film sheet can be removed through the at least one hole. A packaged product is obtainable using the method and apparatus.

13 Claims, 26 Drawing Sheets

(51) Int. Cl.

| | | |
|---|---|---|
| *B65D 81/20* | (2006.01) | |
| *B65B 11/52* | (2006.01) | |
| *B65B 9/04* | (2006.01) | |
| *B65B 31/00* | (2006.01) | |
| *B65B 57/00* | (2006.01) | |
| *B65B 61/02* | (2006.01) | |
| *B29C 65/78* | (2006.01) | |
| *B29C 65/18* | (2006.01) | |
| *B29C 65/00* | (2006.01) | |
| *B29C 69/00* | (2006.01) | |

(52) U.S. Cl.
CPC .............. *B65B 31/08* (2013.01); *B65B 57/00* (2013.01); *B65B 61/02* (2013.01); *B65D 81/2038* (2013.01); *B29C 65/18* (2013.01); *B29C 65/7847* (2013.01); *B29C 66/112* (2013.01); *B29C 66/131* (2013.01); *B29C 66/24244* (2013.01); *B29C 66/53461* (2013.01); *B29C 66/72341* (2013.01); *B29C 66/7392* (2013.01); *B29C 66/8322* (2013.01); *B29C 66/8324* (2013.01); *B29C 66/849* (2013.01); *B29C 69/005* (2013.01)

(58) Field of Classification Search
USPC .................. 206/213.1, 497, 524.8, 557–565; 220/789–790; 426/107, 113, 124, 234, 426/243
See application file for complete search history.

(56) References Cited

U.S. PATENT DOCUMENTS

| | | |
|---|---|---|
| 3,491,504 A | 1/1970 | Young et al. |
| 3,498,021 A | 3/1970 | Harder et al. |
| 3,574,642 A | 4/1971 | Weinke |
| 3,681,092 A | 8/1972 | Titchenal et al. |
| 3,706,174 A | 12/1972 | Young et al. |
| 3,713,849 A | 1/1973 | Grindrod et al. |
| 4,055,672 A | 10/1977 | Hirsch et al. |
| RE30,009 E | 5/1979 | Perdue et al. |
| 4,162,599 A | 7/1979 | Kyle |
| 4,919,955 A | 4/1990 | Mitchell |
| 4,933,193 A | 6/1990 | Fisher |
| 5,025,611 A | 6/1991 | Garwood |
| 5,226,531 A | 7/1993 | Garwood |
| 5,323,590 A | 6/1994 | Garwood |
| 5,346,735 A | 9/1994 | Logan et al. |
| 5,419,101 A | 5/1995 | Gorlich |
| 5,481,852 A | 1/1996 | Mitchell |
| 5,667,827 A | 9/1997 | Breen et al. |
| 5,697,203 A | 12/1997 | Niwa |
| 7,506,491 B2 | 3/2009 | Rimondi |
| 7,921,625 B1 | 4/2011 | Mayer |
| 8,197,925 B2* | 6/2012 | Sankey ............... B32B 3/10 426/113 |
| 8,608,008 B2* | 12/2013 | Gingras ............ B65D 43/0254 220/270 |
| 8,640,430 B2 | 2/2014 | Aarts |
| 10,414,567 B2* | 9/2019 | Palumbo ............. B65D 75/305 |
| 2005/0074531 A1 | 4/2005 | Patterson |
| 2005/0257501 A1 | 11/2005 | Natterer |
| 2006/0147588 A1 | 7/2006 | Garwood |
| 2007/0022717 A1 | 2/2007 | Seggem |
| 2007/0028566 A1 | 2/2007 | Sferrazza et al. |
| 2009/0313954 A1 | 12/2009 | Aarts |
| 2010/0258471 A1* | 10/2010 | Enriquez ............. B65D 81/343 206/557 |
| 2011/0068042 A1 | 3/2011 | Palumbo |
| 2012/0204516 A1 | 8/2012 | Palumbo et al. |
| 2016/0340098 A1* | 11/2016 | Palumbo ............ B65D 81/2015 |

FOREIGN PATENT DOCUMENTS

| | | |
|---|---|---|
| DE | 102006022418 A1 | 11/2007 |
| DE | 202009010873 U1 | 10/2009 |
| DE | 102009017993 A1 | 11/2010 |
| EP | 0320294 A2 | 6/1989 |
| EP | 2284085 A1 | 2/2011 |
| FR | 1258357 A | 4/1961 |
| FR | 1286018 A | 3/1962 |
| JP | S51153078 U | 12/1976 |
| RU | 2494935 C1 | 10/2013 |
| WO | 9714313 A1 | 4/1997 |
| WO | 2007131683 A2 | 11/2007 |
| WO | 2008022815 A1 | 2/2008 |
| WO | 2009141214 A1 | 11/2009 |
| WO | 2011012652 A1 | 2/2011 |

* cited by examiner

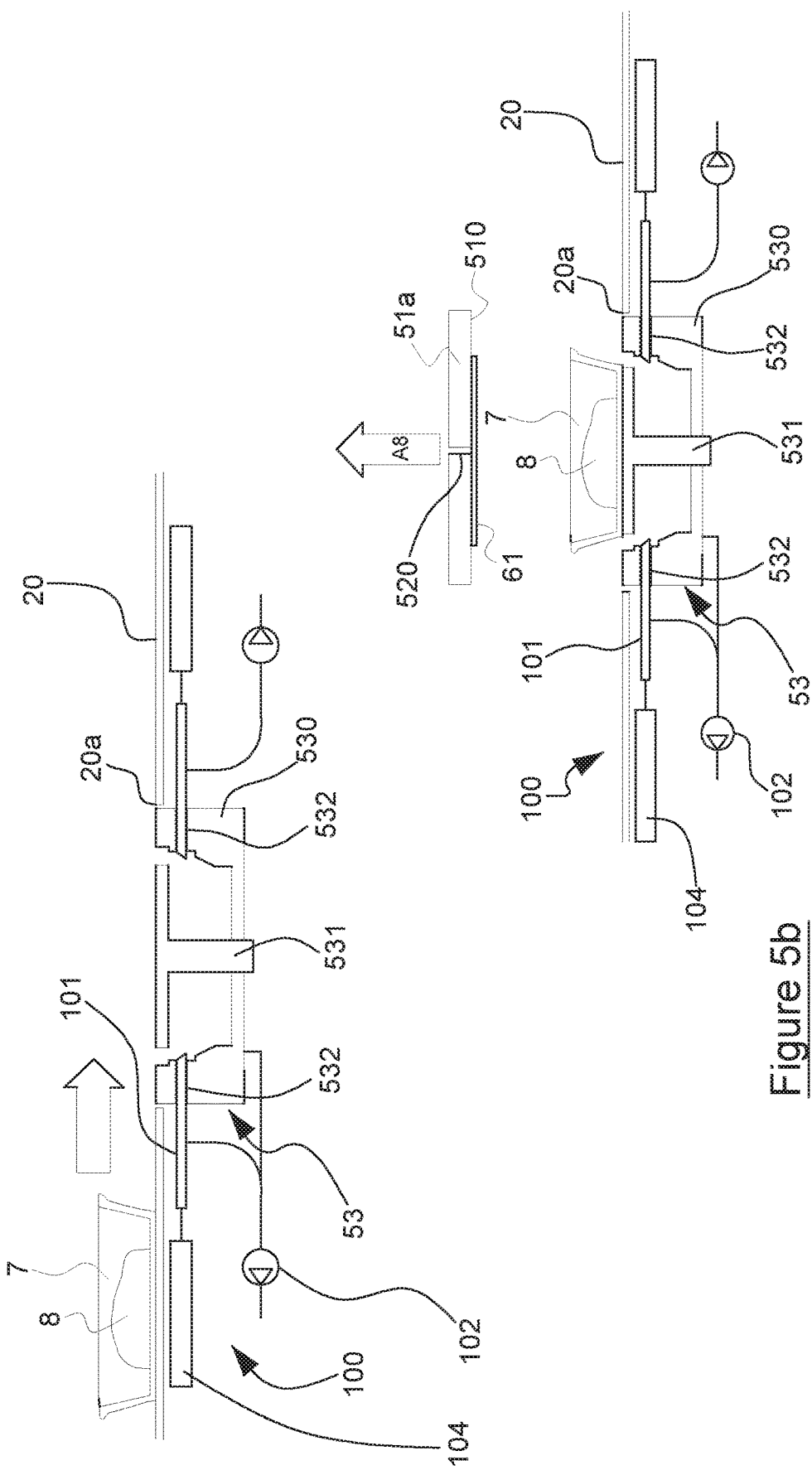

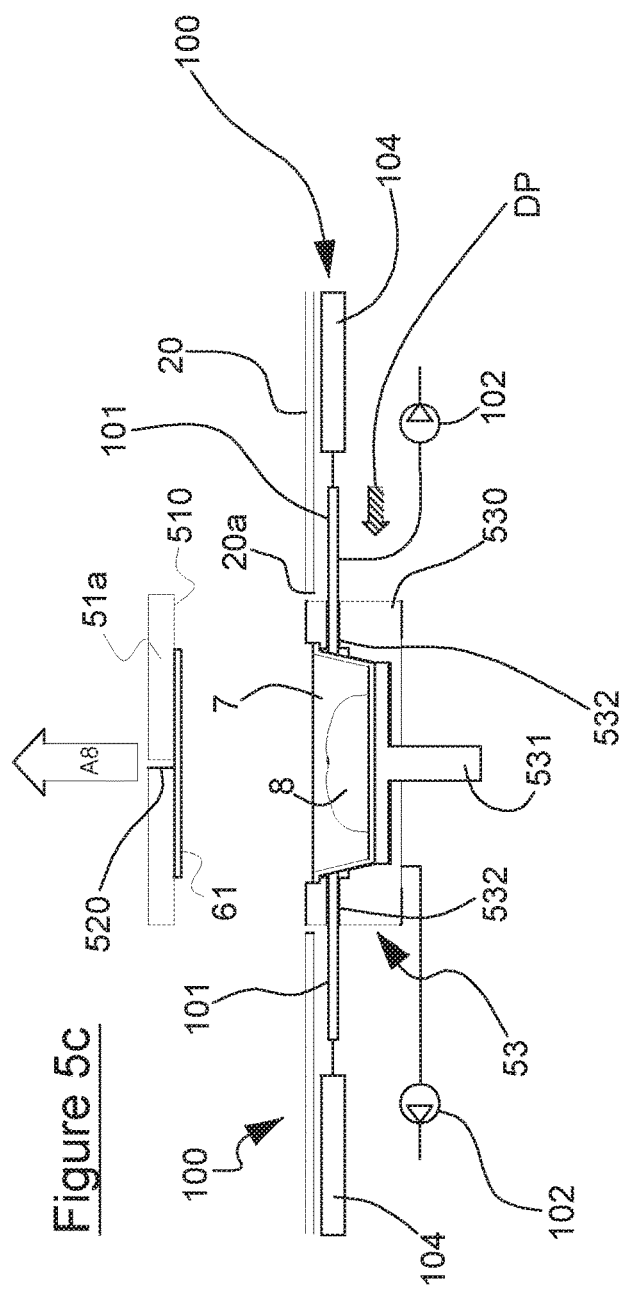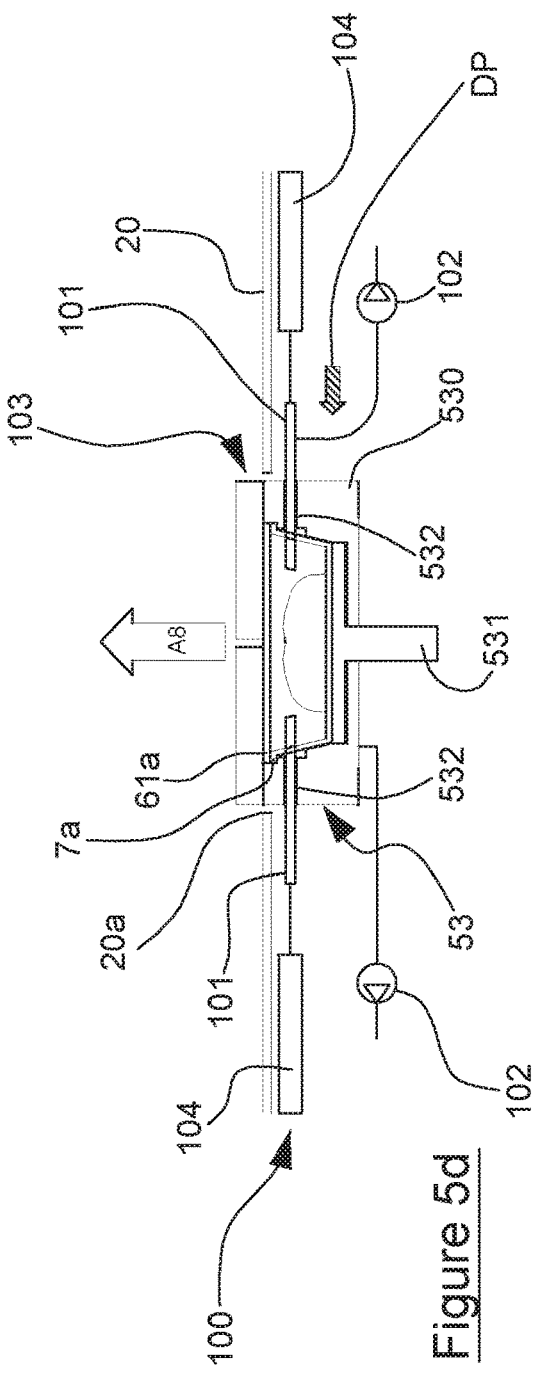

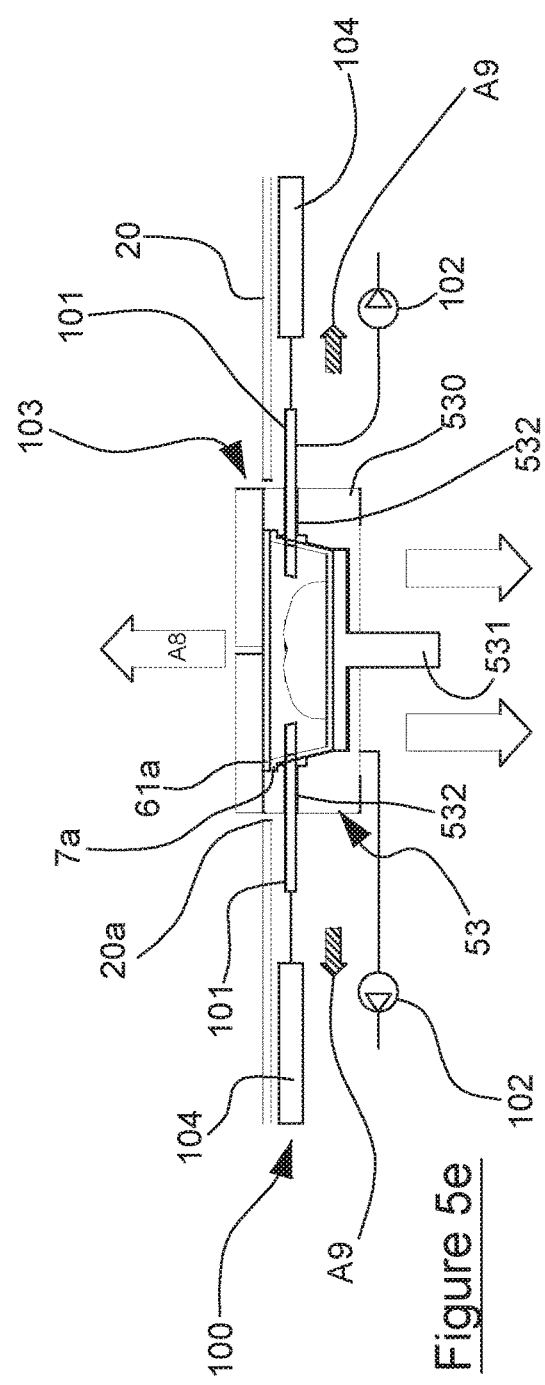
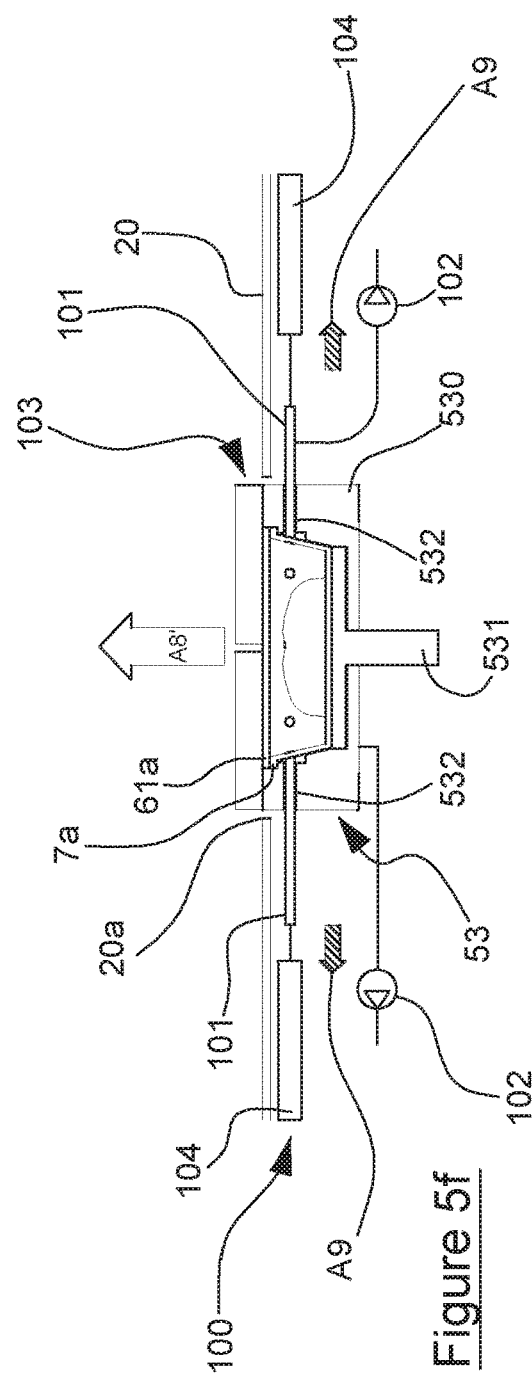

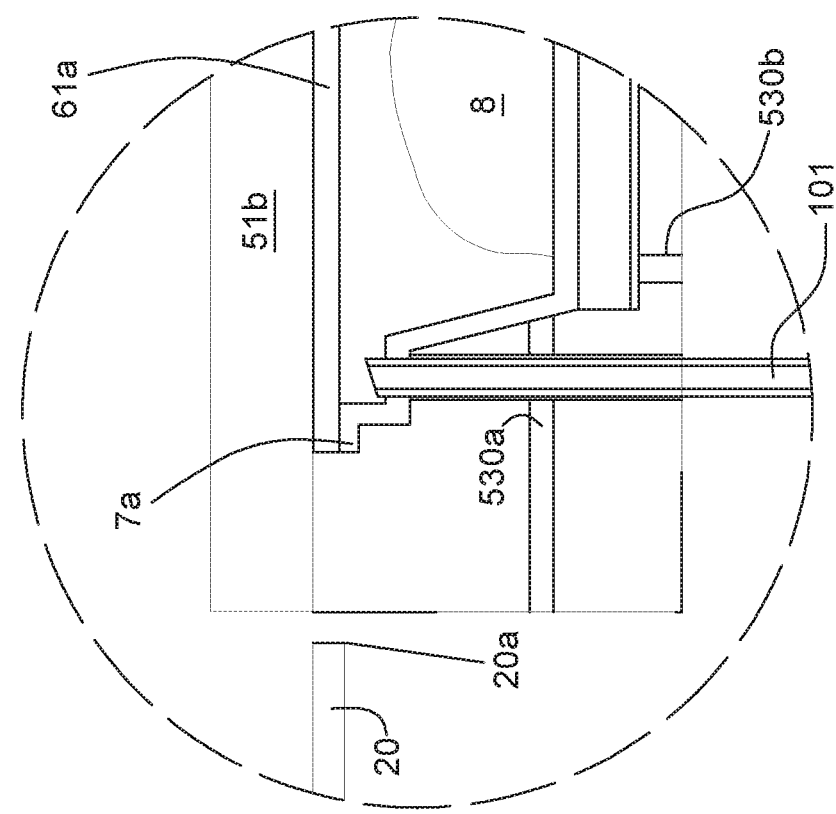
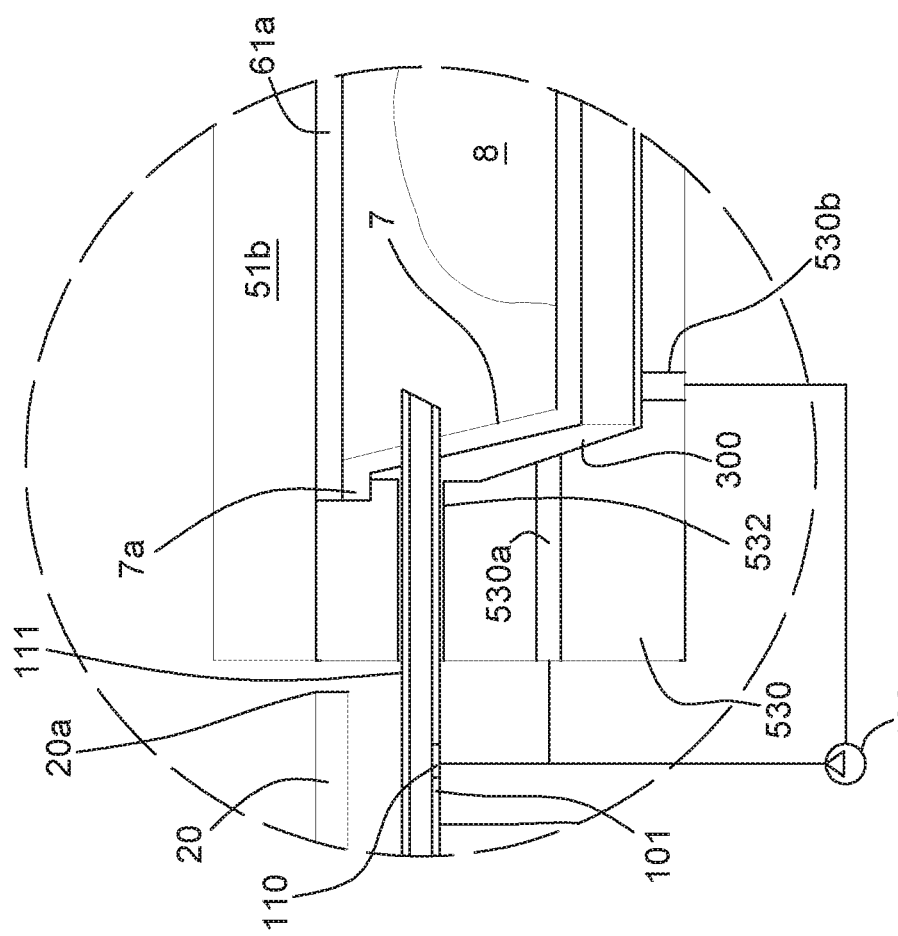

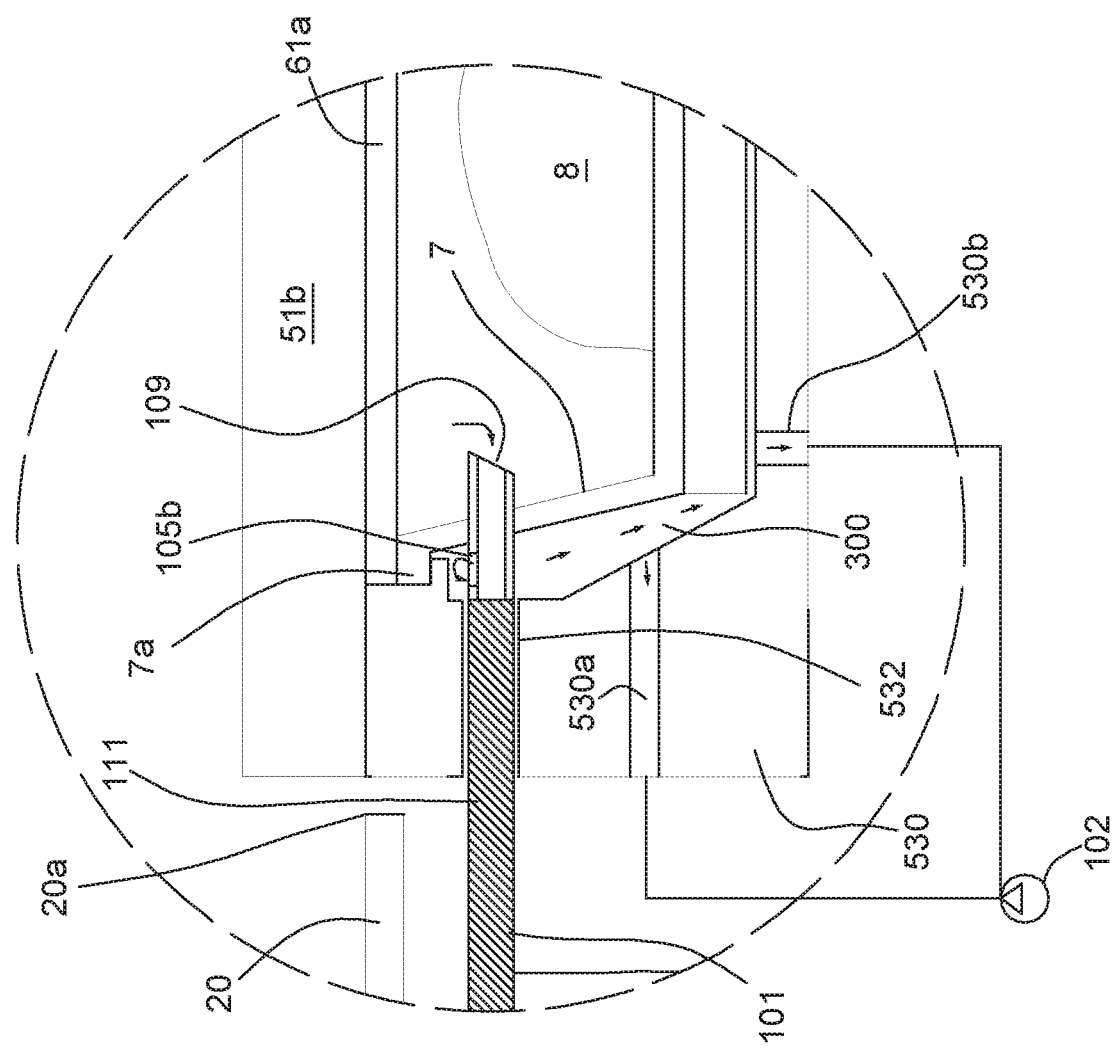

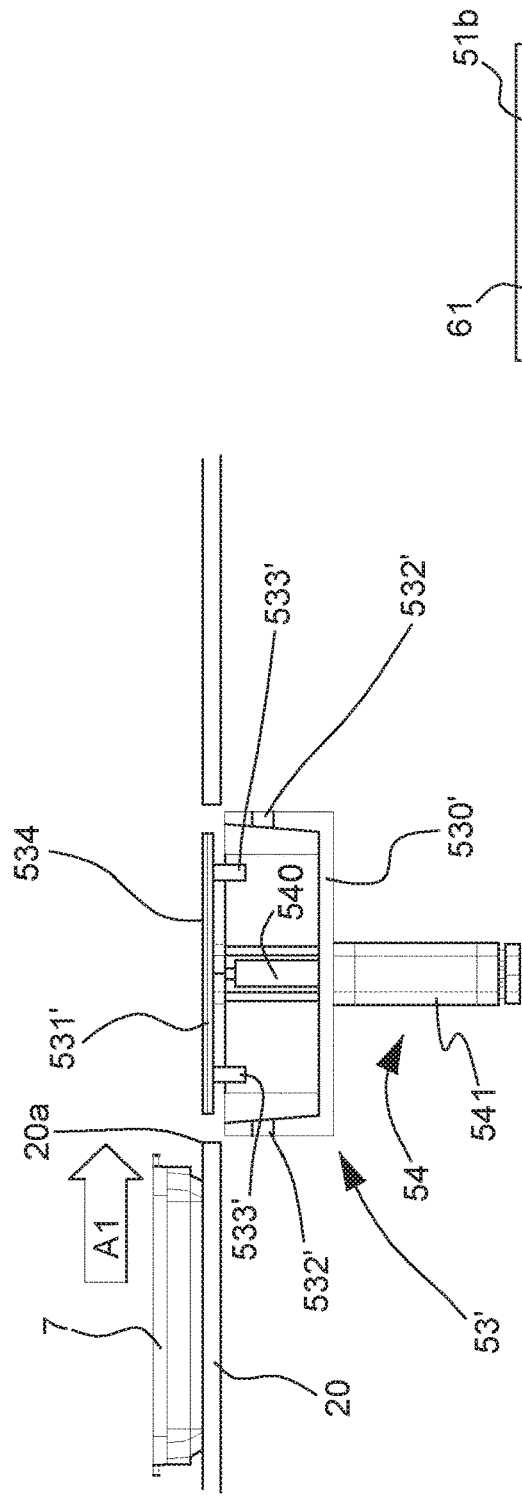
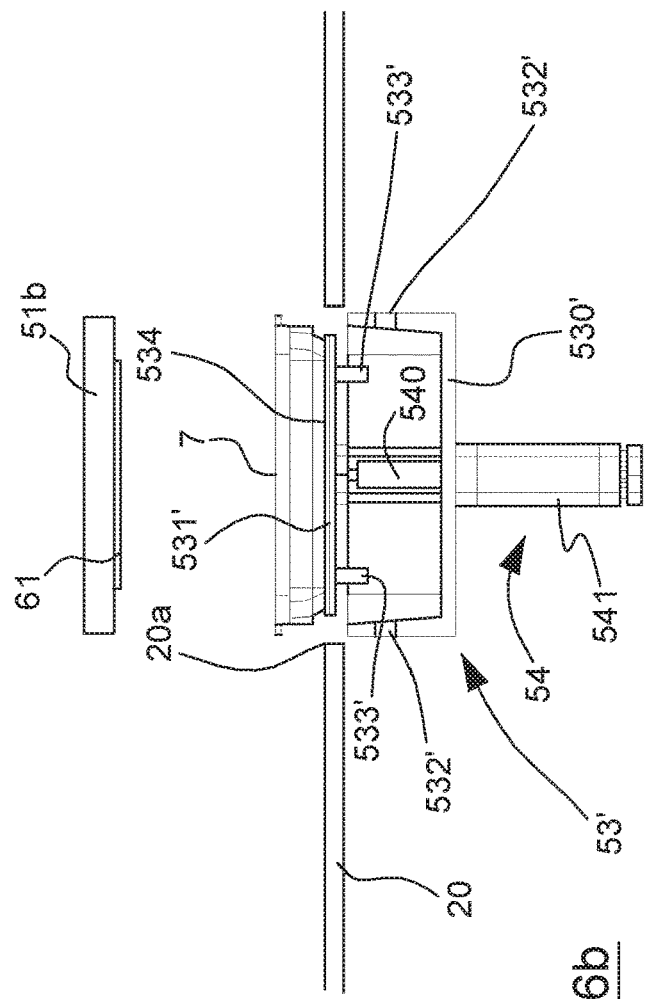
Figure 6a
Figure 6b

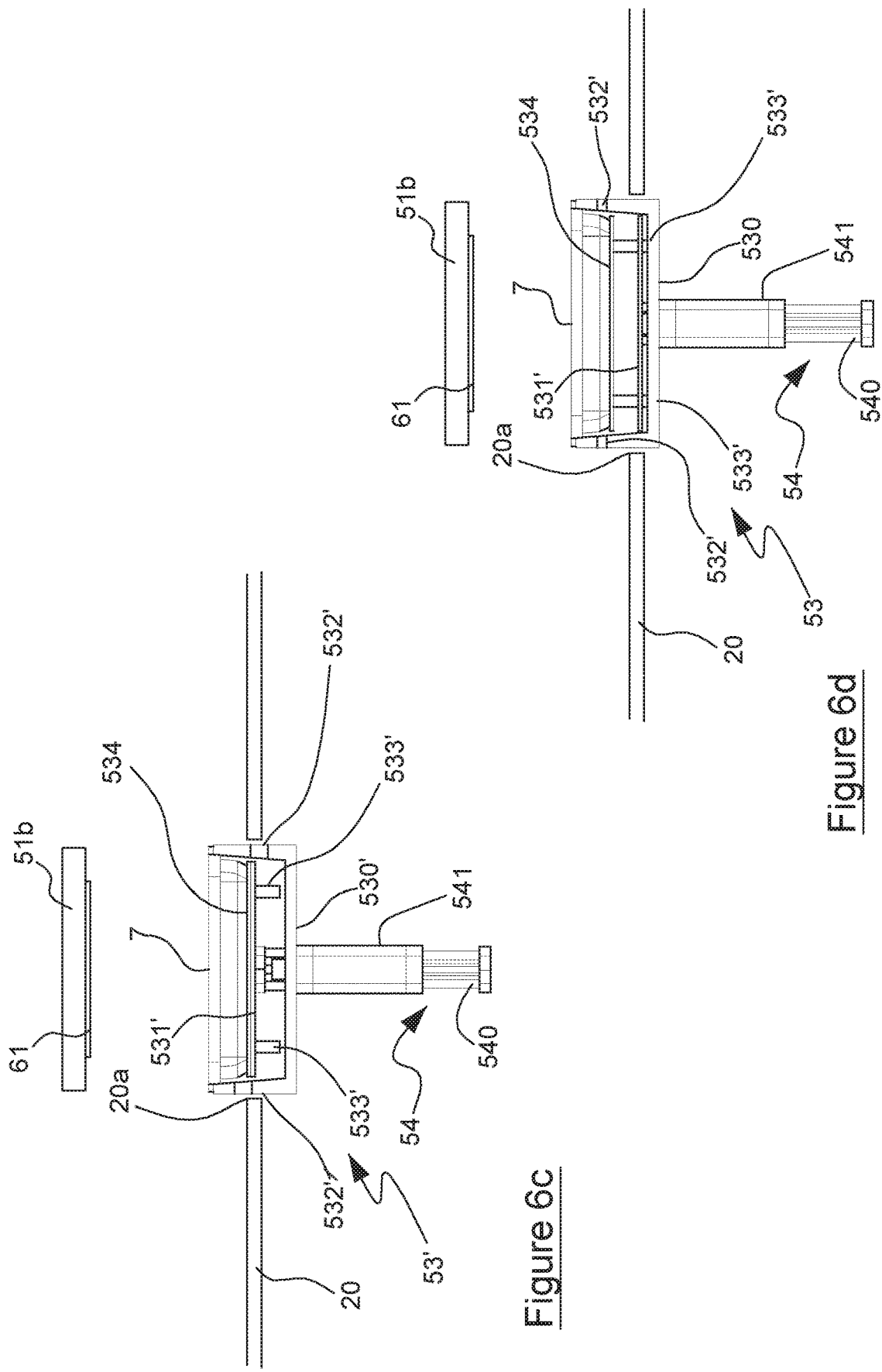

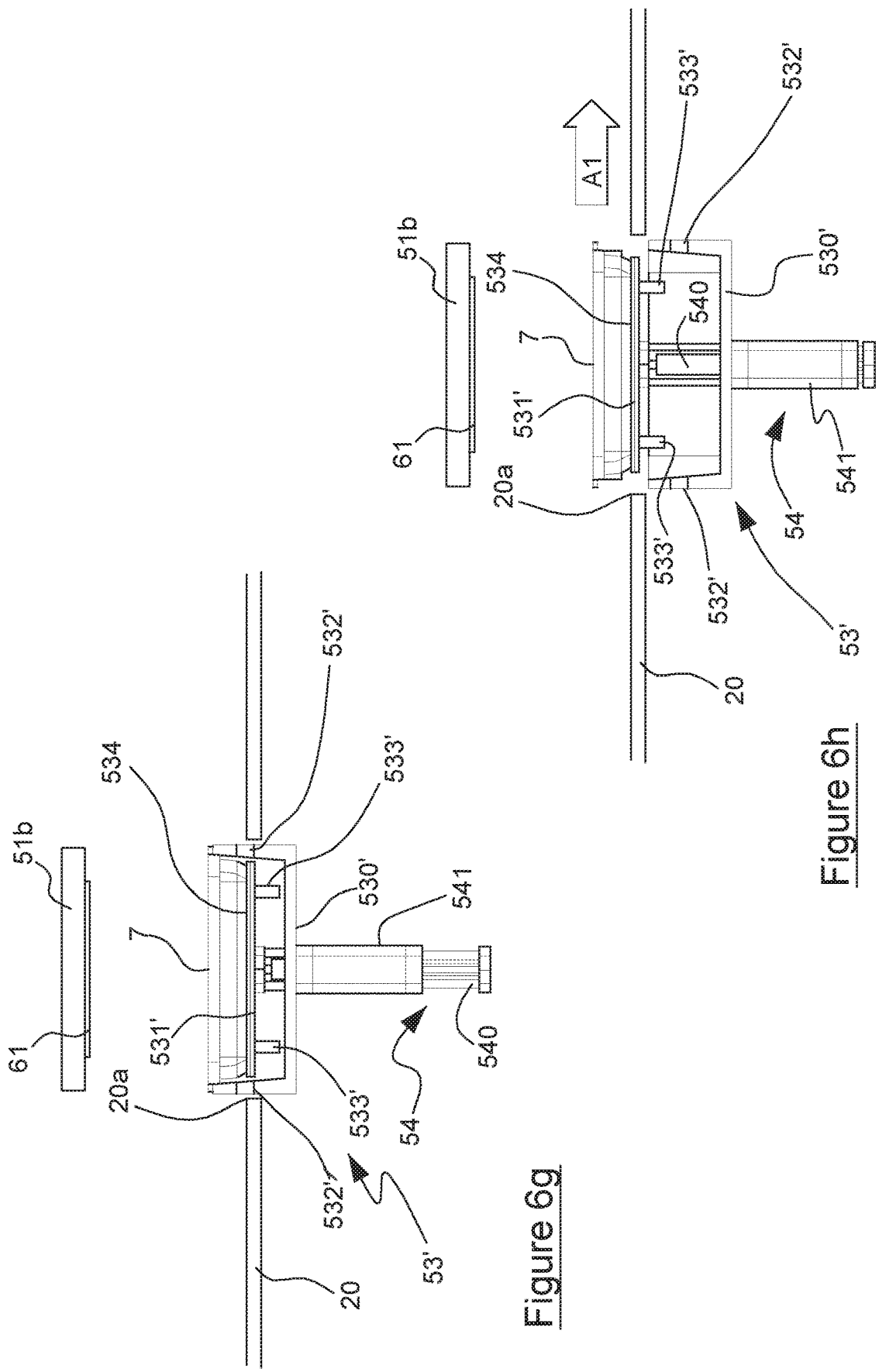

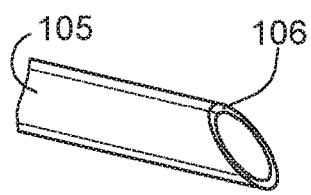
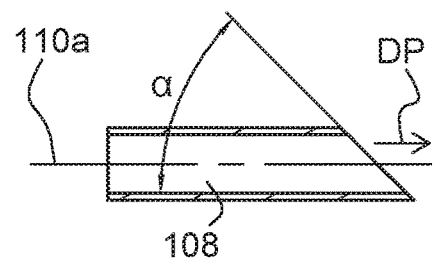
Figure 8a     Figure 8b     Figure 8c
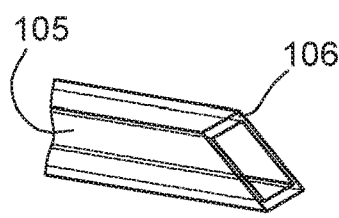 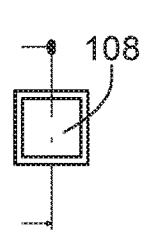 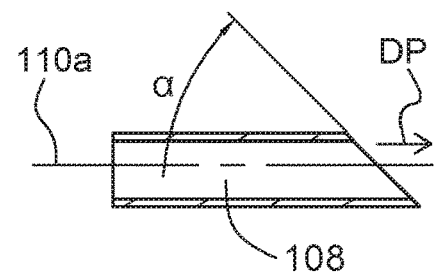
Figure 9a     Figure 9b     Figure 9c
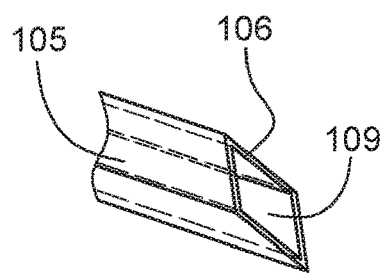 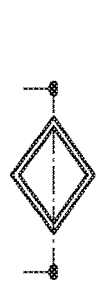 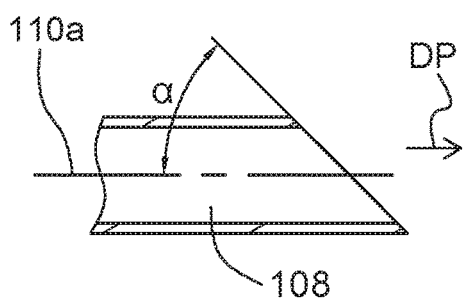
Figure 9a'     Figure 9b'     Figure 9c'
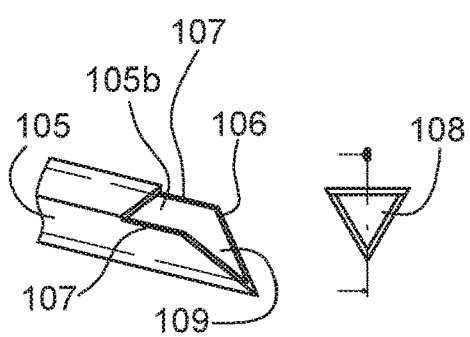 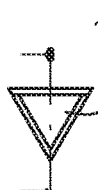 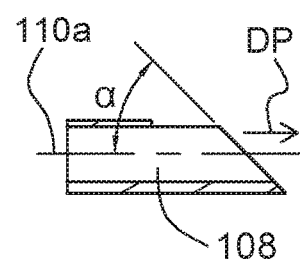 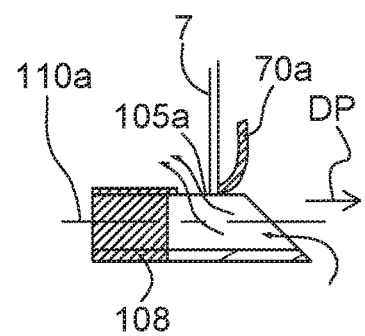
Figure 10a    Figure 10b    Figure 10c    Figure 10d

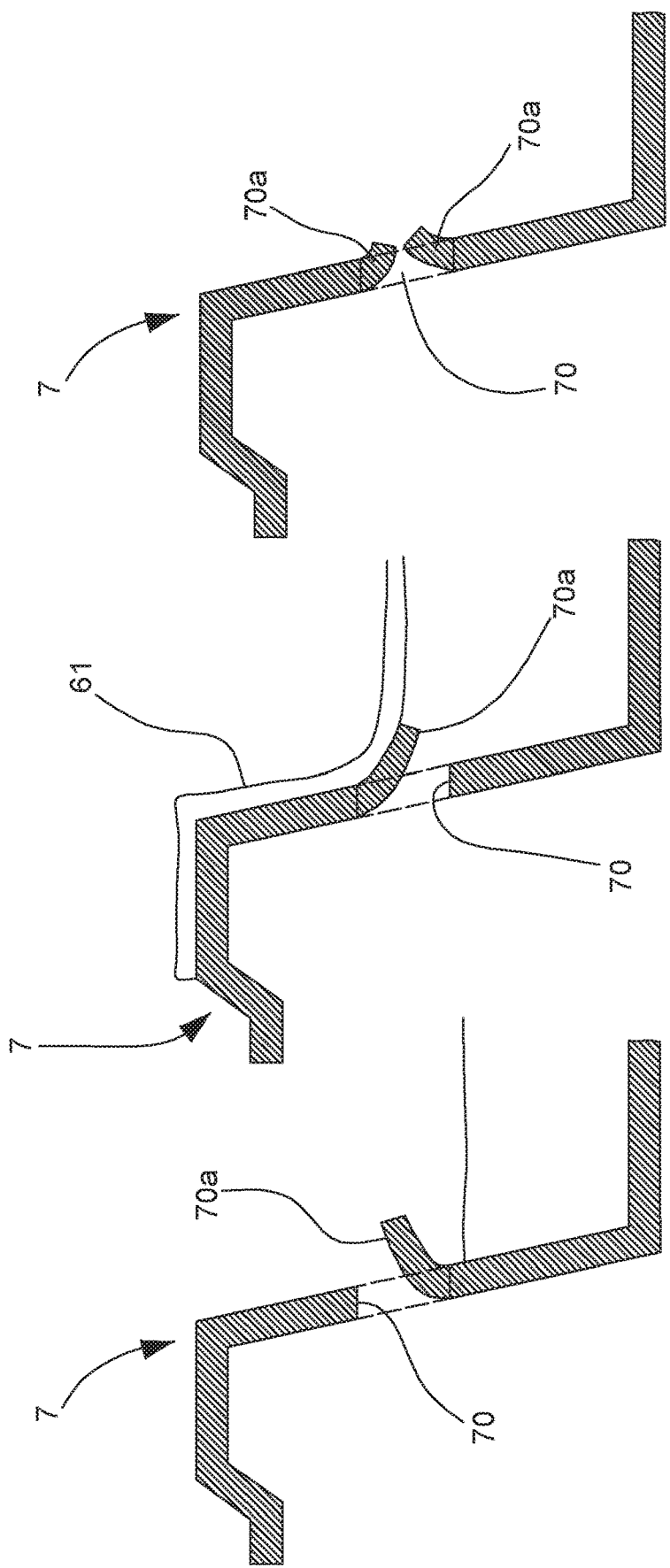

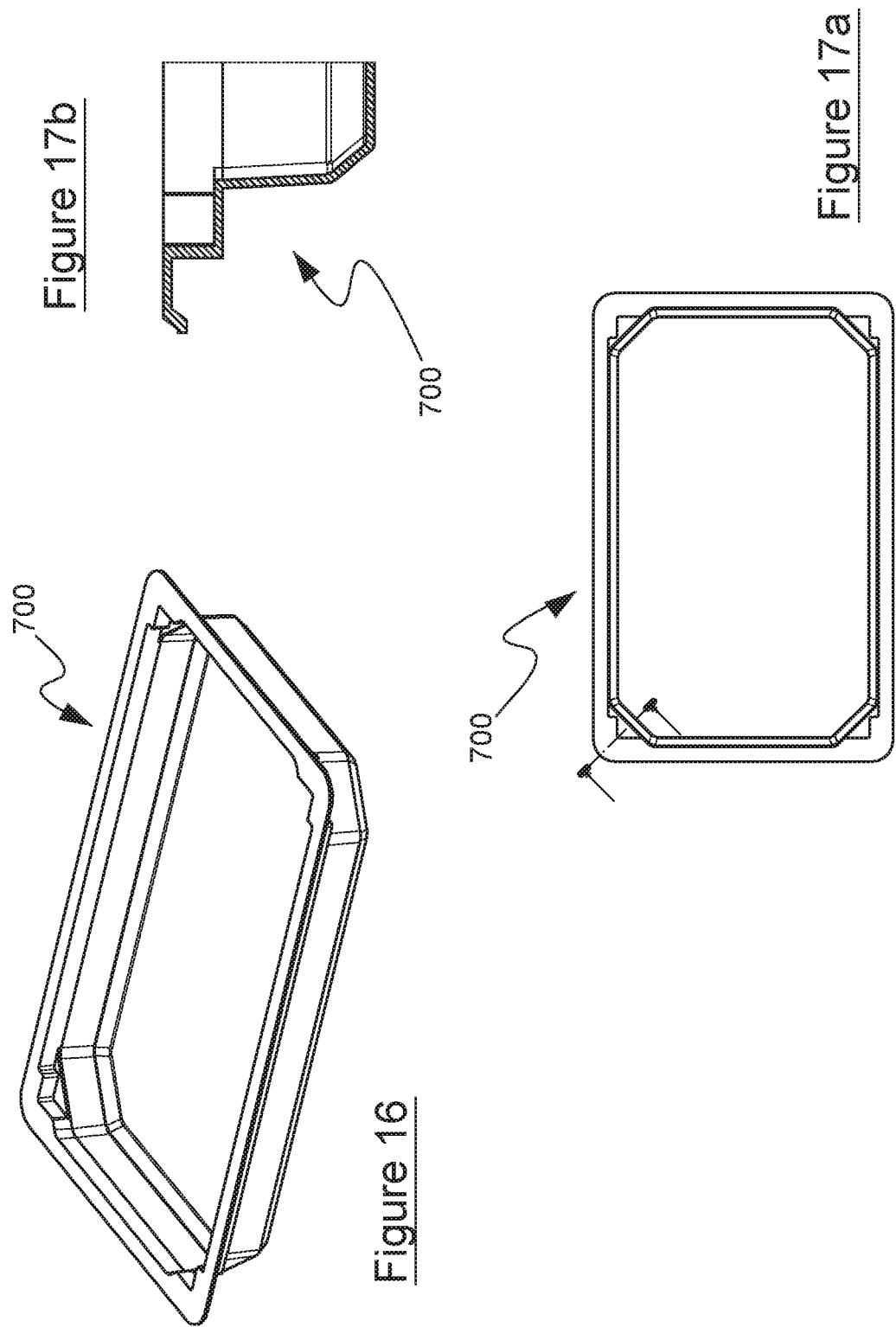

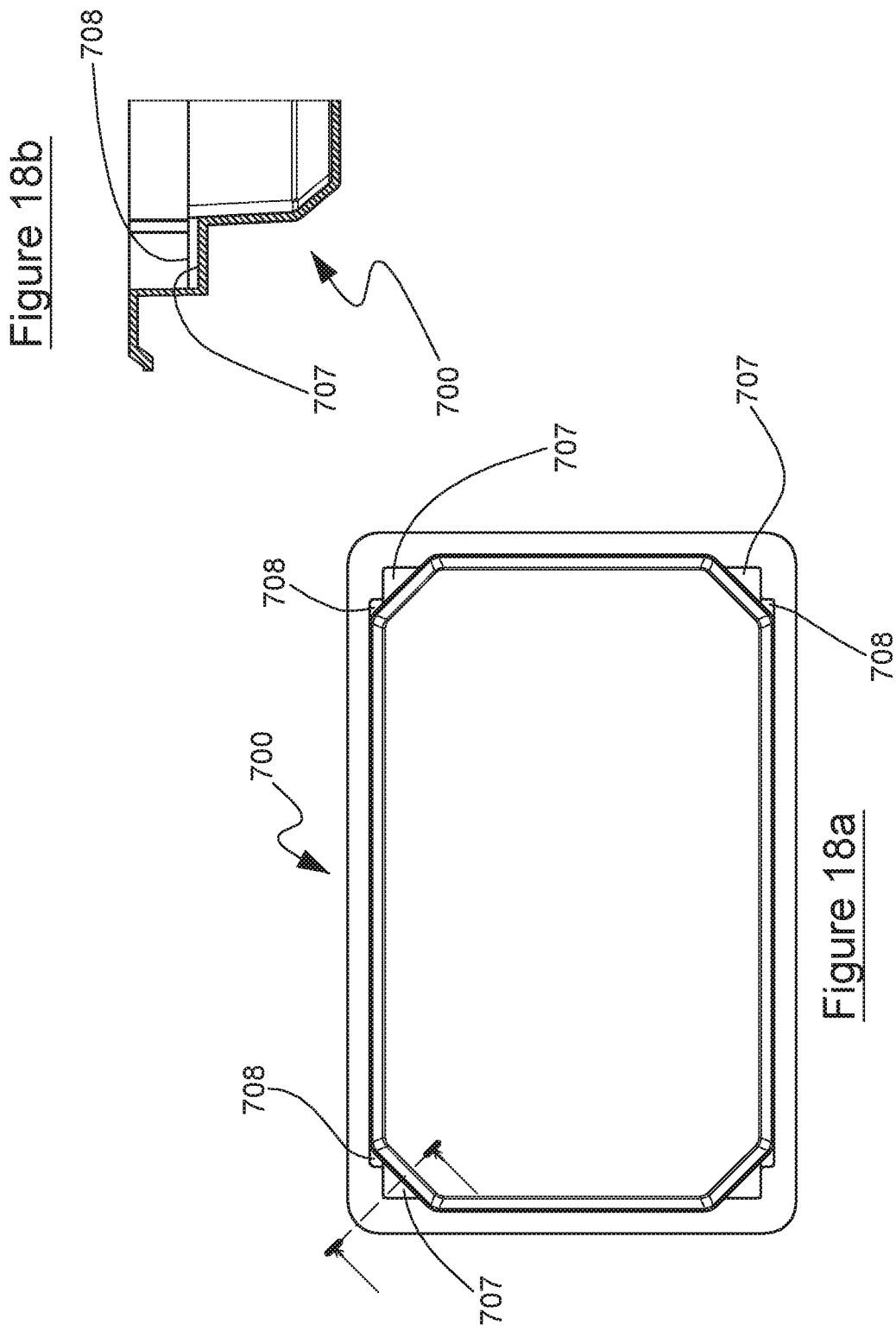

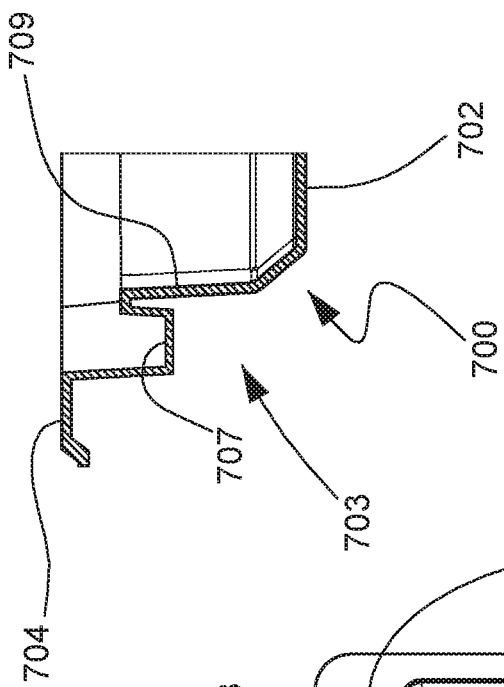
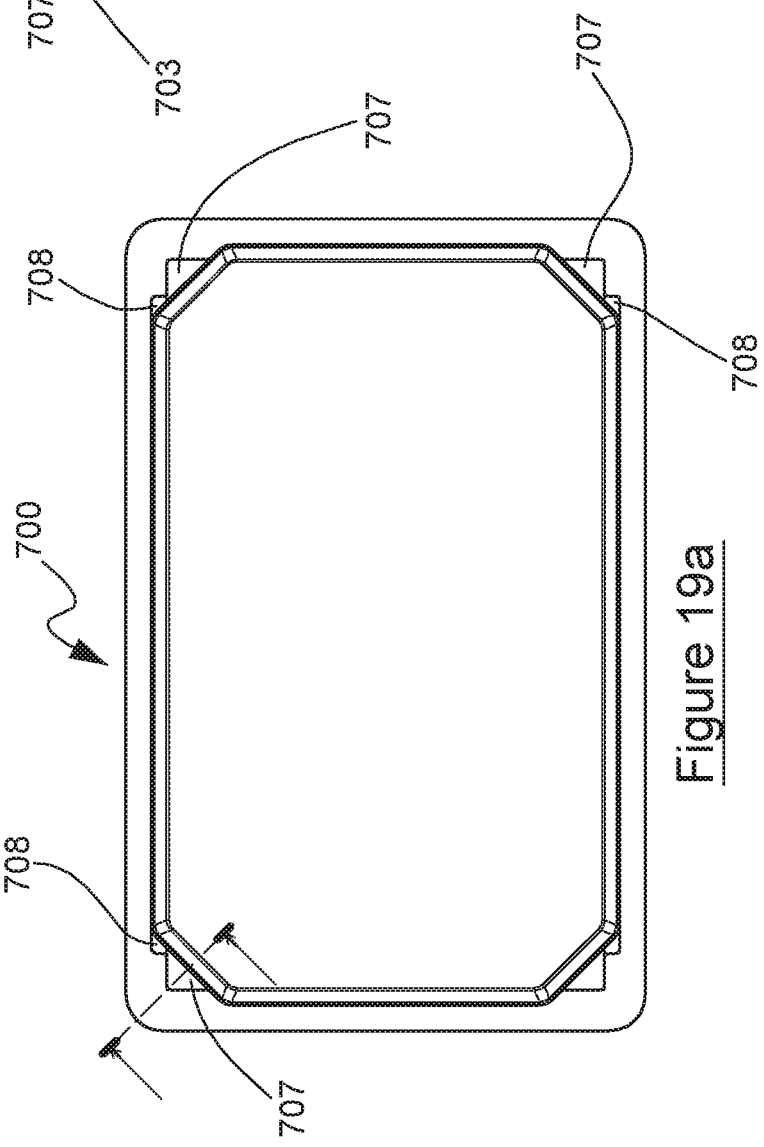

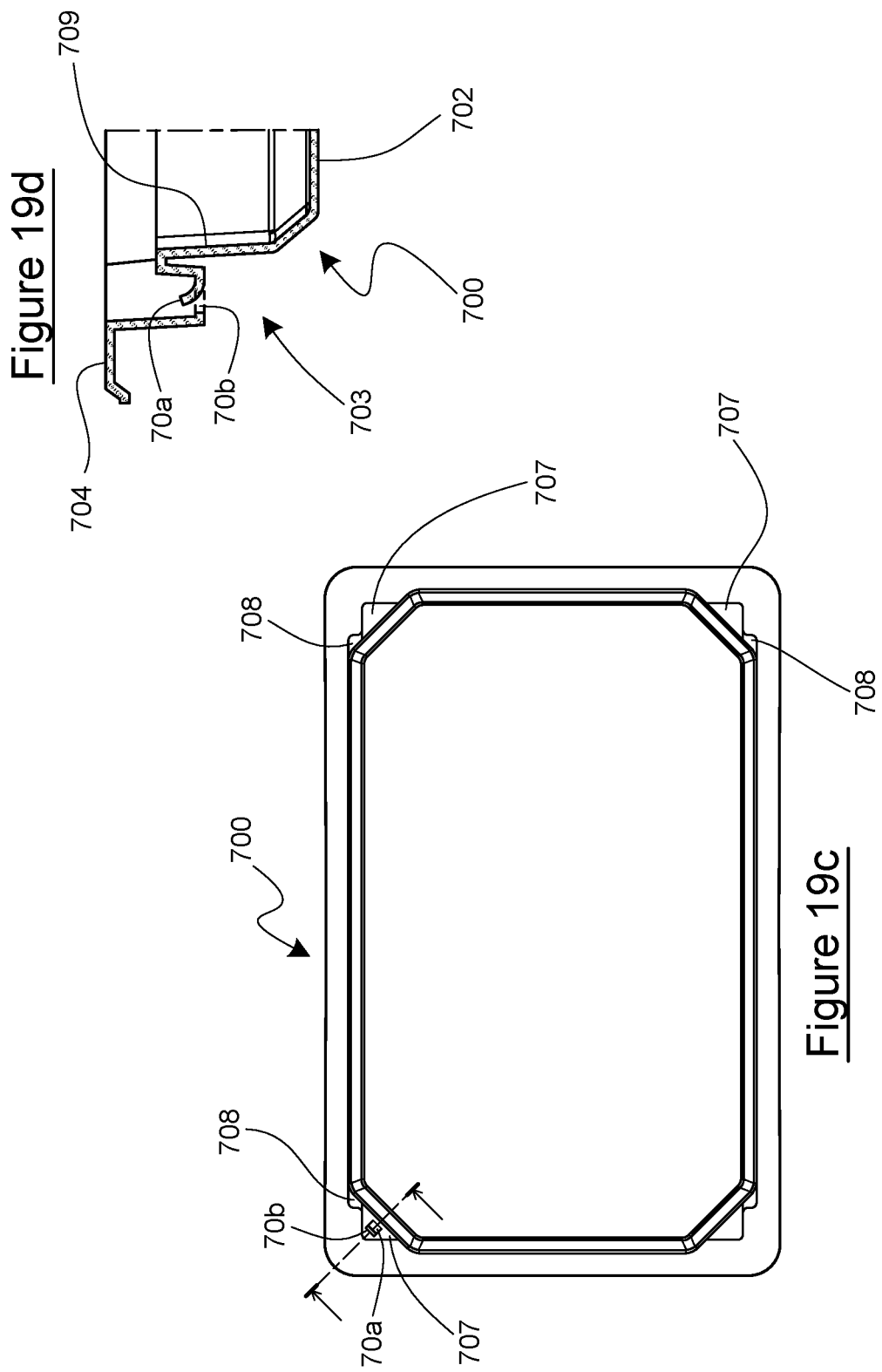

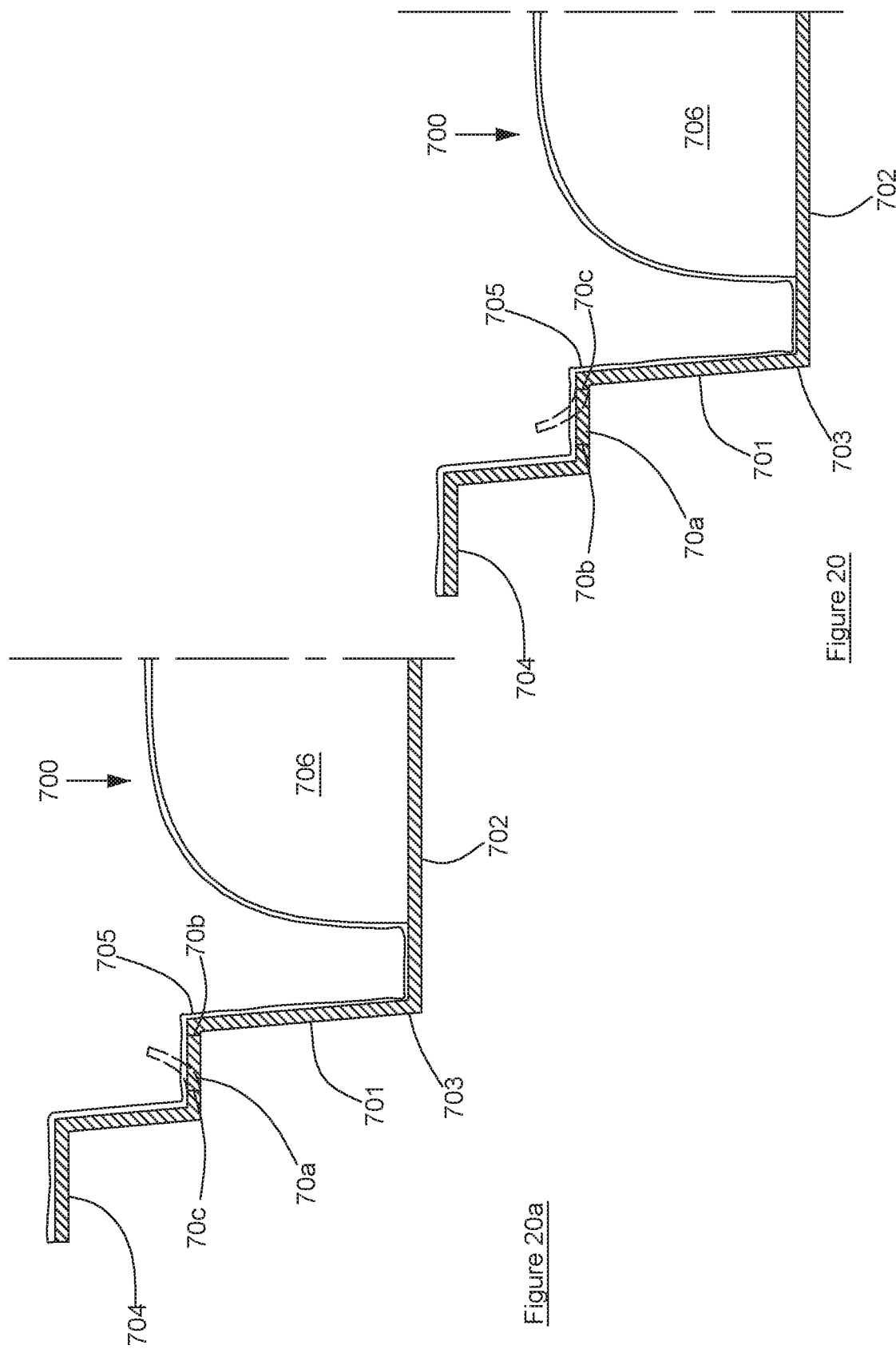

APPARATUS AND METHOD FOR VACUUM SKIN PACKAGING OF A PRODUCT

CROSS REFERENCE TO RELATED APPLICATIONS

This application is a continuation of U.S. application Ser. No. 14/436,790, filed Apr. 17, 2015, which is a national stage entry under 35 U.S.C. § 371 of International Application No. PCT/EP2013/071704, filed Oct. 17, 2013, which claims the benefit of priority from European Patent Application No. 12189327.5, filed Oct. 19, 2012, the contents of each of which are hereby incorporated by reference in their entirety.

TECHNICAL FIELD

The present invention generally relates to an apparatus and to a method for vacuum skin packaging of a product. The invention also relates to a skin packaged product. In particular, the invention relates to a skin packaged product obtainable with said apparatus and method.

BACKGROUND

Vacuum packaging is a well known process for packaging a wide variety of products, in particular food products.

Among the known vacuum packaging processes, vacuum skin packaging is commonly employed for packaging food products such as fresh and frozen meat and fish, cheese, processed meat, ready meals and the like. Vacuum skin packaging is described for instance in FR 1 258 357, FR 1 286 018, AU 3 491 504, U.S. Pat. Nos. RE 30,009, 3,574, 642, 3,681,092, 3,713,849, 4,055,672, and 5,346,735.

Vacuum skin packaging is basically a thermoforming process. In particular, the product is typically placed on a rigid or semi-rigid support (such as a tray, a bowl or a cup). The support with the product placed thereon is put in a vacuum chamber, where a film of thermoplastic material, held by vacuum in a position above the product placed on the support, is heated to soften it. The space between the support and the film is then evacuated and finally vacuum above the film is released to cause the film to drape down all around the product and seal to the surface of the support not covered by the product, thus forming a tight skin around the product and on the support.

US 2007/0022717 discloses a machine for gastight packaging an object using a film material. The machine has a lower tool for supporting two trays and an upper tool having cutting devices and facing the lower tool. A film is interposed between the upper tool and the lower tool. The film is firstly cut to the size of the peripheral rims of the trays, and is applied subsequently and/or simultaneously to the peripheral rim in a gastight manner. A vacuum is situated in the surrounding region of the tray to cause deep-drawing of the film in response to the formation of a pressure drop.

US 2005/0257501 discloses a machine for packaging a product arranged in a tray. The machine has a lower tool for supporting the tray and an upper tool with a cutting device. During operation, the film is clamped along an edge surrounding the tray and is deformed by the upper tool in a direction extending away the product. The space surrounding the product is then evacuated, the film and the edge of the tray are sealed and the film is then cut by the cutting device.

U.S. Pat. No. 3,481,101 discloses a method for making skin packages using a support provided with a plurality of apertures in a lip thereof. According to this method, after the tray is filled, a heated cover film is draped upon the tray and vacuum is applied so that the air within the package is drawn from the package and the film is drawn into heat sealing condition with the tray to form a hermetic seal of the cover to the tray lip. Additional apertures may be provided in the upper sidewalls of the tray whereupon the heated film is not only drawn into sealing contact with the lip of the tray, but also is drawn down partially into the cavity.

EP 320294 discloses a skin packaging method wherein a product loaded tray provided with a vent in its sidewall is placed on a vacuum platen, an excess of the thermoplastic film is held over the tray by a frame and heated until it starts to sag over the product, then vacuum is applied from below the tray to pull the film to conform to the surface of the product and over and around the rim of the tray in a thermally set crimp seal. The excess film is then trimmed.

In most of the above solutions, removal of air from the interior of the support tray is possible only as long as the film is held above the support tray and the product. As soon as the film contacts and seals the top edge of the tray, air can no longer be removed from within the tray. Thus, particularly when a deep tray is used as a support for the product, air pockets may disadvantageously remain entrapped between the film and the bottom surface of the support. These air pockets may negatively influence the shelf-life of the product as well as the impression that the consumer has of the package.

In the skin packaging methods of U.S. Pat. No. 3,481,101 and EP 0320294, the apertures provided in the support tray allow removal of air from within the support even after the film has contacted the support tray, thus reducing the risk of leaving air pockets in the package. Although these solutions have improved the capability of removal of air from within the tray, the packaging methods described in U.S. Pat. No. 3,481,101 and EP 0320294 require use of suitably designed trays. This implies a certain burden in the production chain. Moreover, the position or size of the holes or venting channels present on the tray may not be always optimized to the specific packaging machine. Additionally, the presence of holes on the tray walls causes an undesirable aesthetic perception of the overall packaging.

Trays with pre-manufactured holes are known from U.S. Pat. No. 4,919,955, WO9714313 and US2005074531. The holes present on the trays disclosed in U.S. Pat. No. 4,919, 955 and US2005074531 are provided with a valve means.

It is therefore an object of the present invention to provide an apparatus and a method capable of adequately solving the problem of air removal from the tray, without impairing in term of overall packaging costs.

Moreover, it is an auxiliary object providing a method and an apparatus which are capable of efficiently remove air from the tray during packaging.

Additionally, it is an object providing a method and an apparatus which may be implemented with no need of complex changes to conventional packaging systems.

Another auxiliary object is an apparatus capable of operating in a safe manner.

A further auxiliary object is an apparatus and a method capable of achieving the goal of air removal without impairing on the aesthetics of the final packaged product.

Another object of the invention is a new package having a design allowing efficient air removal and improving the aesthetic perception of the package.

SUMMARY

At least one of the above objects is substantially reached by an apparatus and by a method according to one or more of the appended claims.

Apparatus and processes according to aspects of the invention and capable of achieving one or more of the above objects are here below described.

According to a first aspect, the present invention provides a machine:

A 1st aspect concerns an apparatus (1) for packaging a product (8) arranged on a support (7), said support (7) having a base wall and side wall, said apparatus (1) comprising:
a frame (10);
a transport assembly (2) arranged on the frame (2) and configured for displacing one or more supports (7) along a predefined path;
a packaging assembly (5) carried by said frame (10) and operative at a packaging station (201) positioned along said path, the packaging assembly (5) being configured for tightly fixing a film sheet (61) to said one or more supports (7);
at least one perforating unit (100) having a perforating tool (101) operable between a rest position, where the tool (101) is spaced apart from the side wall of said support (7), and an operating position, where the tool (101) acts on said support (7) and forms at least one though hole (70) in said side wall; and
a vacuum arrangement (102), for instance comprising one or more pumps, configured for removing air from within said support (7) underneath said film sheet (61) at least in part through said at least one hole (70).

In a 2nd aspect according to the 1st aspect, the apparatus further comprises:
a holder (103) configured for keeping in a predetermined position the support (7) at least during perforation,
at least one actuator (104) connected to at least one respective perforating tool (101) and configured for displacing the perforating tool (101) according to a prefixed direction of perforation (DP) intersecting the side wall of said support (7) when this latter is placed in said predetermined position.

In a 3rd aspect according to any one of the preceding aspects, the perforating tool (101) has a pointed tip (105) configured for progressively contacting the side wall of the support (7) upon displacement of the perforating tool (101) from the rest position to the operating position.

In a 4th aspect according to the preceding aspect the pointed tip (105) presents one or more cutting edges (106), each one of said cutting edges (106) being positioned on the pointed tip (105) such as to define a side profile which is inclined with respect to a/the prefixed direction of perforation (DP), said cutting edges (106) being positioned and configured such that upon perforation of the side wall of the support (7), the pointed tip (105) cuts a flap element in the side wall.

In a 5th aspect according to any one of the preceding aspects the perforating tool (101) presents an elongated conformation along a longitudinal axis (101a) of prevalent development and the cutting edge side profile is inclined by an acute angle (α) with respect to said longitudinal axis of the perforating tool.

In a 6th aspect according to any one of the preceding aspects said pointed tip (105) of the perforating tool (101) comprises two cutting edges (106) having distal portions (106a) converging to form a V shaped geometry at a distal end of tip (105), the two distal portions (106a) being inclined by an angle (α) with respect to a longitudinal axis (110a) of the perforating tool (101).

In a 7th aspect according to the preceding aspect the cutting edges include two further portions (106b), adjacent to and in prosecution of the distal portions (106a), the further portions (106b) terminating into non cutting surfaces (107) which extend towards a proximal end of the tip (105) and delimit an aperture (105b),
wherein the further portions (106b) of cutting edges (106) converge to define non cutting surfaces (107).

In an 8th aspect according to the preceding aspect the further portions (106b) of cutting edges (106) are arc-shaped.

In a 9th aspect according to the 7th or 8th aspect the non cutting surfaces (107) extend at a distance (d) from each other which is smaller than the maximum distance (w) between cutting edges (106), such that upon perforation of the side wall of the support (7), the pointed tip (105) cuts a flap element (70a) in the side wall and the non cutting surfaces (107) urge said flap element in an open position, wherein portions of surfaces (107) define an aperture (105b) of sufficient size to allow suction of air/gas coming from the inside of the support (7).

In a 10th aspect according to any one of the preceding aspects the perforating tool (101) of each perforating unit (100) defines a tip aperture (109) connected to a suction aperture (101; 105b) spaced from the tip aperture and in fluid communication with said vacuum arrangement (102) in order to remove air from within said support (7) when the perforating tool tip (105) is inserted in said at least one hole (70).

In an 11th aspect according to any one of the preceding aspects the frame (10) defines a sliding plane (20) for the support (7) and wherein the transport assembly (2) comprises a conveyor (21) having at least a portion positioned above the sliding plane (20) and configured for displacing the support (7) above the sliding plane (20) and along said path from a loading station (200), where one or more supports are received by the conveyor, to the packaging station (201), where at least one support (7) can be positioned.

In a 12th aspect according to any one of the preceding aspects the said perforating unit (100) is carried by the frame and operates in correspondence of the packaging station, the perforating unit (100) being configured to form at least one hole in the side wall of the at least one support present in the packaging station.

In a 13th aspect according to any one of the preceding aspects said perforating unit (100) operates in correspondence of a tray-holding station configured for holding in prefixed positions a number of empty supports (7), the tray-holding station being operative at or upstream the loading station, the perforating unit (100) being configured to form at least one hole in the side wall of the at least one support located in the tray-holding station.

In a 14th aspect according to any one of the preceding aspects the sliding plane (20) has an aperture (20a) located in correspondence of the packaging station and the packaging assembly (5) comprises a base unit (53), configured for receiving and holding the support (7), and a top unit, operating above the base unit (53) and configured for positioning the film sheet (61) above the base unit (53).

In a 15th aspect according to the preceding aspect the base unit and the top unit are relatively movable such as to place a rim of the support (7) and a corresponding portion of the film sheet (61) in mutual contact between a heated surface of the top unit and an abutment surface of the base unit (53).

In a 16th aspect according to any one of the preceding two aspects the base unit (53) defines a chamber configured for housing said at least one support (7) and presents passages (530a, 530b; 530a', 530b'), either on its side wall or on its bottom wall, designed to place into fluid communication the vacuum arrangement (102) and a volume (300; 300') defined at least between an external surface of the support (7) and an inner surface of the base unit (53).

In a 17th aspect according to any one of the preceding aspects the apparatus comprises a control unit (120) connected to the transport assembly (2), the packaging assembly (5), the perforating unit (100) and the vacuum arrangement (101), said control unit being configured for:

commanding the transport assembly (2) to displace said support (7) along the predefined path;

commanding the packaging assembly (5) to tightly fix the film sheet (61) to said support (7) when this latter has reached the packaging station;

commanding the perforating unit (100) to displace the perforating tool (101) from the rest position to the operating position thereby creating at least one though hole (70) on said support side wall; and commanding the vacuum arrangement (102) to remove air from within said support (7) underneath said film sheet (61) through said at least one hole (70).

In an 18th aspect according to the preceding aspect the control unit (120) is further configured to:

determine when the support (7) is positioned in the base unit (53) of the packaging assembly (5) and, command displacement of the perforating tool (101) from the rest position to the operating position only after the support (7) is properly positioned in the base unit (53).

In a 19th aspect according to any one of the preceding two aspects the control unit (120) is further configured to:

determine when the perforating tool (101) has reached the operating position and, command the vacuum arrangement (102) to remove air from within said support (7) while keeping the perforating tool (101) in said operating position.

In a 20th aspect according to the 17th or the 18th aspect the control unit (120) is further configured to:

command the vacuum arrangement (102) to remove air from volume (300; 300') defined between the base unit (53) and outer surface of the support (7) before the perforating tool (101) has started creating said at least one hole such that a pressure difference is defined between the inside of the support or tray (7) and the volume (300; 300') and, subsequently or contemporaneously, command displacement of the perforating tool (101) to the operating position progressively perforating the side wall of the support, continuing to command the vacuum arrangement (102) to remove air from within said support (7) while keeping the perforating tool (101) in said operating position.

A 21st aspect concerns a method for vacuum skin packaging of at least one product (8) arranged on a support (7) using the apparatus of any one of the preceding aspects.

A 22nd concerns a method for vacuum skin packaging of at least one product (8) arranged on a support comprising the following steps:

providing a film sheet (61) above said at least one support (7) with said product (8) being arranged between the support and the film sheet (61);

air tightly fixing said film sheet (61) to said support (7);

perforating a wall of the support to form at least one through hole (70);

removing at least a portion of air from within said support (7) underneath said film sheet (61) through said at least one hole (70).

In a 23rd aspect according to the preceding aspect, the method steps are sequentially executed.

In a 24th aspect according to any one of the preceding aspects from the 21st to the 23rd the method comprises displacing the support (7) above a sliding plane (20) and along a predefined path from a support loading station (200) to a packaging station (201), where the support housing the product is provided with said air tightly fixed film sheet (61).

In a 25th aspect according to any one of the preceding aspects from the 21st to the 24th the step of perforating takes place when the support is at one station selected in the group comprising:

the packaging station, a tray-holder station located upstream the loading station, a tray-holder station located at the loading station, a tray forming station located upstream the packaging station.

In a 26th aspect according to any one of the preceding aspects from the 21st to the 25th the step of perforating comprises the following sub-steps:

displacing a perforating tool (101) according to a prefixed direction intersecting the side wall of said support (7); and progressively contacting the side wall outer surface with the perforating tool (101) and forming a flap element (70a) connected to the support (7) sidewall.

In a 27th aspect according to any one of the preceding aspects from the 21st to the 26th the step of removing air comprises:

removing air from a volume (300; 300') defined between a base unit (53) receiving support (7) and outer surface of the support (7) before a perforating tool (101) has started creating said at least one hole such that a pressure difference is defined between the inside of the support (7) and the volume (300; 300') and, subsequently or contemporaneously, commanding displacement of the perforating tool (101) to the operating position for progressively perforating the side wall of the support, continuing to remove air from within said support (7) while keeping the perforating tool (101) in said operating position.

In a 28th aspect according to any one of the preceding aspects from the 21st to the 27th the step of air tightly fixing said film sheet (61) to said support (7) comprises:

blocking a rim of the support (7) and a corresponding portion of the film sheet (61) between a heated surface of a top unit (51; 51a, 51b) and an abutment surface of a base unit (53), holding the support (7) such that the rim of the support (7) and the corresponding portion of the film sheet (61) are in mutual contact, wherein the step of perforating takes place before, during or after said blocking step.

In a 29th aspect according to any one of the preceding aspects from the 21st to the 28th the air removing step further comprises waiting until a prefixed time period from initiation of the air removing step has elapsed or a prefixed pressure has been reached within said support (7) underneath said film sheet (61).

In a 30th aspect according to any one of the preceding aspects from the 21st to the 29th, the method comprises the further steps of:

extracting the perforating tool (101) from said hole (70), and aligning the flap element (70a) to the side wall such as to substantially close said hole, with the film sheet (61) draped over the product and welded to the support keeping the flap element (70a) in said closure position and tightly sealing said at least one hole (70) in the side wall.

In a 31st aspect according to the preceding aspect extracting of the perforating tool takes place either when the final desired vacuum level has been reached within the support (7) or when the vacuum has reached a level intermediate between the desired vacuum level and the pressure level present before air removal start.

In a 32nd aspect according to any one of the preceding aspects from the 21st to the 31st progressively perforating the side wall of the support comprises forming, optionally starting from a single rupture point, a cutting line (70b) in the side wall.

In a 33rd aspect according to the preceding aspect said cutting line has an open conformation such that the flap element (70a) is integral with the sidewall and delimited by said open cutting line, said flap element (70a) being connected to the sidewall by a hinge line (70c) extending between ends of said cutting line (70b).

In a 34th aspect according to any one of the preceding aspects from the 21st to the 33rd the side wall of the support (7) upwardly terminates in an outwardly projecting horizontal rim, said step of air tightly fixing said film sheet (61) to said support (7) comprising welding the film sheet (61) at least to the top surface of said horizontal rim.

In a 35th aspect according to any one of the preceding aspects from the 21st to the 34th said support (7) is a tray having a bottom wall of polygonal, optionally rectangular, shape and wherein the step of perforating comprises forming said hole(s) in correspondence of corner(s) of the side wall.

In a 36th aspect according to any one of the preceding aspects from the 21st to the 35th said support (7) is a tray having one or more horizontal ledges present in the upper half of the side wall area, each of said horizontal ledges being located in correspondence of one of said corners.

In a 37th aspect according to the preceding aspect each of said horizontal ledges has substantially the shape of a right-angle triangle.

In a 38th aspect according to the preceding aspect vertical and mutually perpendicular facets emerge from converging orthogonal edges of each of said horizontal ledges.

In a 39th aspect according to any one of the preceding aspects from the 36th to the 38th the step of perforating comprises forming said hole(s) in correspondence of a respective corner in the form of an aperture through the side wall portion.

A 40th aspect concerns a vacuum skin package (700) of the type obtained with the method of any one of the preceding aspects from the 21st to the 39th.

A 41st aspect concerns a vacuum skin package (700), e.g. of the type obtainable with the method of any one of the preceding aspects from the 21st to the 39th, comprising:
- a tray (701) presenting a bottom wall (702) and a side wall (703) upwardly extending from said bottom wall (702), the sidewall having at least one hole (70) in the side wall (703);
- a flap element (70a) connected to the tray side wall (703), wherein the flap element (70a) is positioned in correspondence of said hole (70);
- a product (706) loaded on the tray (701); and
- a film draped (705) over the product and welded to an inner surface of the tray (701) wherein at least a portion of said film (705) keeps the flap element (70a) in a fixed position relative to the side wall (703) and tightly closes said at least one hole (70).

In a 42nd aspect according to any one of the preceding two aspects the vacuum skin package has the flap element (70a) aligned to the tray side wall (703) and substantially closing said hole (70), the film (705) adhering to the flap element (70a) which matches the contour of said hole (70) and remains flush with respect to a surface of the side wall (703).

In a 43rd aspect according to any one of the preceding aspects from the 40th to the 42nd the flap element (70a) is integral with the side wall (703) and delimited by an open cutting line (70b), said flap element (70a) being connected to the side wall (703) by a hinge line (70c) extending between ends of said cutting line (70b).

In a 44th aspect according to the preceding aspect, the hinge line (70c) has length (l) not greater than the maximum width (w) of the flap element measured parallel to the hinge line (70c).

In a 45th aspect according to the preceding aspect the hinge line (70c) has length (l) greater than 0.2 (⅕) of said maximum width (w) of the flap element.

In a 46th aspect according to any one of the preceding aspects from the 43rd to the 45th the height (h) of the flap element—measured perpendicular to the hinge line—is greater than 0.2 of the length (l) of the hinge line.

In a 47th aspect according to any one of the preceding aspects from the 43rd to the 46th the height (h) of the flap element—measured perpendicular to the hinge line—is greater than 0.5 of the length (l) of the hinge line.

In a 48th aspect according to any one of the preceding aspects from the 43rd to the 47th the height (h) of the flap element—measured perpendicular to the hinge line—is smaller than 3 times the length of the same hinge line.

In a 49th aspect according to any one of the preceding aspects from the 40th to the 48th the side wall of the support (7) upwardly terminates in an outwardly projecting horizontal rim (704).

In a 50th aspect according to the preceding aspect said film (705) is also welded to the top surface of said horizontal rim.

In a 51st aspect according to any one of the preceding aspects from the 40th to the 50th, the tray bottom wall (702) is of polygonal, optionally rectangular, shape.

In a 52nd aspect according to any one of the preceding aspects from the 40th to the 51st the hole or the holes (70) is/are located in correspondence of corner(s) of the side wall (703).

In a 53rd aspect according to any one of the preceding aspects from the 40th to the 52nd the side wall (703) comprises one or more horizontal ledges present in the upper half of the side wall (703) area,
wherein each of said horizontal ledges is located in correspondence of one of said corners.

In a 54th aspect according to the preceding aspect each of said horizontal ledges has substantially the shape of a right-angle triangle.

In a 55th aspect according to the preceding aspect vertical and mutually perpendicular facets emerge from converging orthogonal edges of each of said horizontal ledges.

In a 56th aspect according to any one of the preceding aspects from the 40th to the 55th each hole (70) is formed in correspondence of a respective corner of the support or tray in the form of an aperture through the side wall (703) portion.

In a 57th aspect according to any one of the preceding aspects from the 40th to the 56th the side wall (703) upwardly terminates in an outwardly projecting horizontal rim and comprises horizontal ledges at corner regions wherein—at an inner edge of each horizontal ledge—the side wall (703) presents a protecting protuberance, each horizontal ledge being vertically positioned at a lower height compared to said outwardly projecting horizontal rim and extending between said protuberance and a further side wall (703) portion departing from the horizontal ledge and terminating at said horizontal rim.

BRIEF DESCRIPTION OF THE DRAWINGS

The present invention will become clearer by reading the following detailed description, given by way of example and not of limitation, to be read with reference to the accompanying drawings, wherein:

FIGS. 5a to 5h show various steps of the vacuum skin packaging, according to a variant of the invention;

FIG. 5i shows an enlarged view of a detail of FIG. 5d;

FIG. 5j shows an enlarged view of a variant of the particular disclosed in FIG. 5d;

FIG. 5k shows an enlarged view of a further variant of the particular disclosed in FIG. 5d;

FIGS. 6a to 6h show various steps of the vacuum skin packaging, according to a second variant.

FIGS. 8a, 9a, 9a', 10a, 11a, 12a represent perspective views of the tip portions of various possible variants of perforating units, according to aspects of the invention;

FIGS. 8b, 9b, 9b', 10b, 11b, 12b respectively represent cross sections of the tip portions of FIGS. 8a, 9a, 9a', 10a, 11a, 12a;

FIGS. 8c, 9c, 9c', 10c, 11c, 12c respectively represent longitudinal sections of the tip of FIGS. 8a, 9a, 10a, 11a, 12a;

FIGS. 13-15 are schematic and partially interrupted sections of trays or supports after perforation according to aspects of the invention;

FIG. 16 is a perspective view of a tray or support before perforation takes place;

FIG. 17a is a top view of the tray of FIG. 16;

FIG. 17b is a cross section of the corner area of the tray or support according to the section plane represented in FIG. 17a;

FIG. 18a is a top view of a further example of tray or support before perforation takes place;

FIG. 18b is a cross section of the corner area of the tray or support according to the section plane represented in FIG. 18a;

FIG. 19a is a top view of a yet further example of tray or support before perforation takes place;

FIG. 19b is a cross section of the corner area of the tray or support according to the section plane represented in FIG. 19a;

FIG. 19c is a top view of an example of tray or support having a hole located in correspondence of a respective corner in the form of an aperture through the side wall portion defining a horizontal ledge;

FIG. 19d is a cross section of the corner area of the tray or support according to the section plane represented in FIG. 19c;

FIGS. 20 and 20a are interrupted cross sections of a package according to a further aspect of the invention.

DETAILED DESCRIPTION

Figure 1:
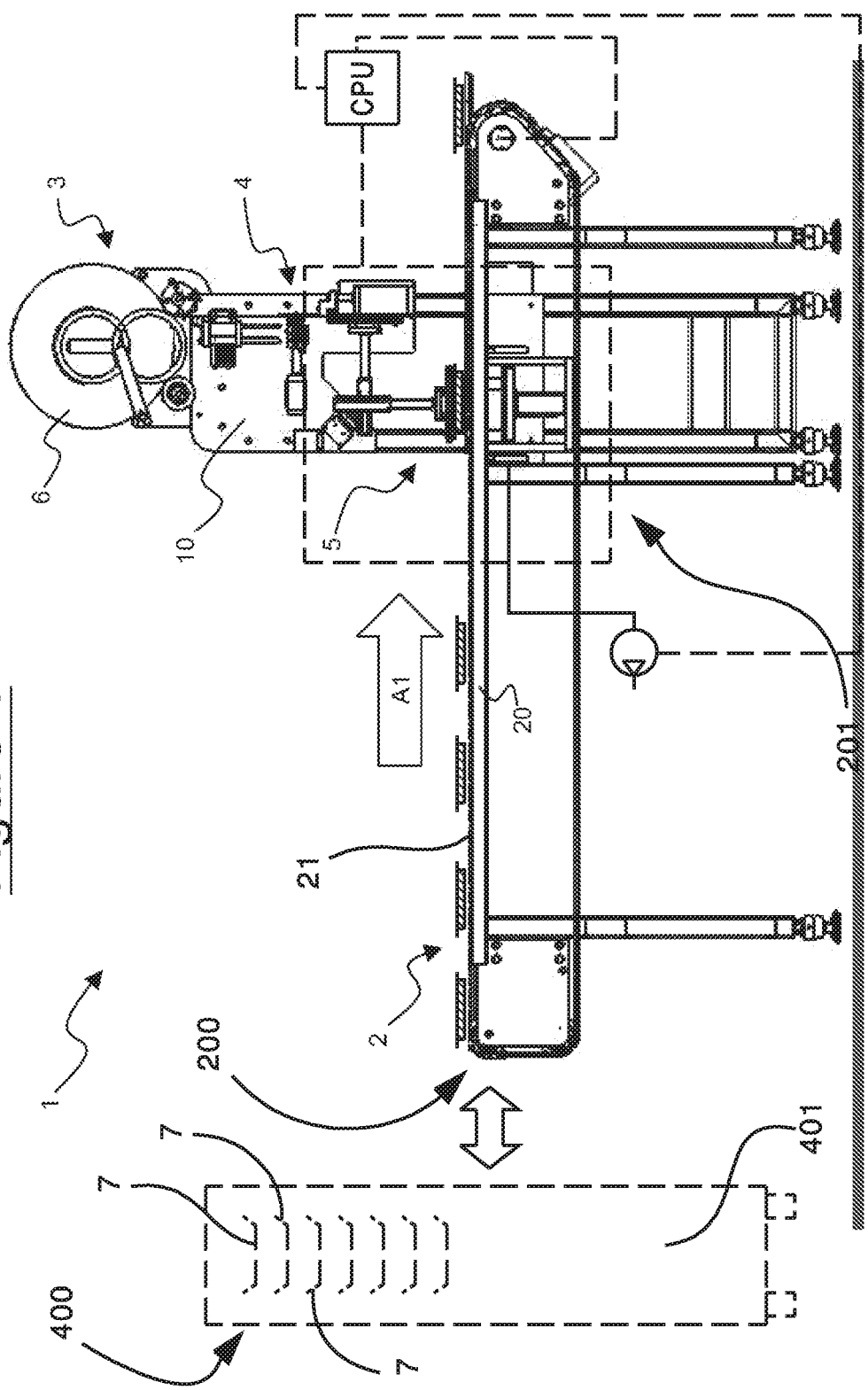
FIG. 1 is a side view of an apparatus according to a first embodiment of the present invention with certain components only schematically represented.
Figure 2:
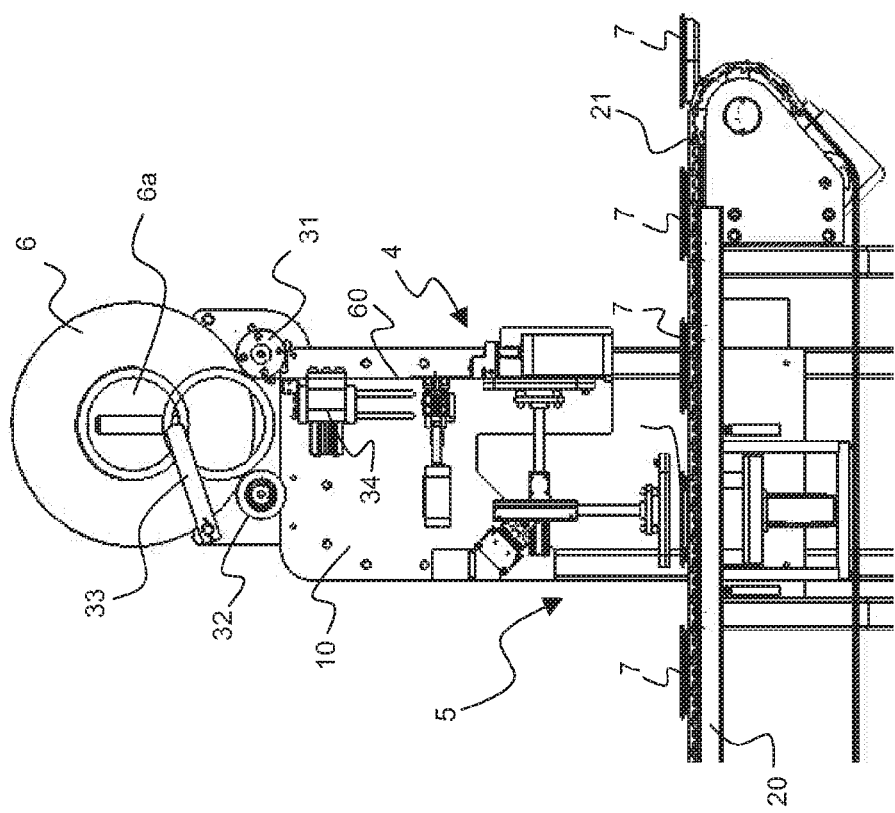
FIG. 2 is a more detailed side view of a portion of the machine of FIG. 1.

It should be noted that in the present detailed description corresponding parts shown in the various Figures are indicated with the same reference numeral through the Figures. Note that the Figures are not in scale.

First Embodiment of the Apparatus 1

FIGS. 1, 2, 3, and 4 show an apparatus 1 for packaging of a product arranged on a support or tray according to an embodiment of the present invention. The apparatus 1 is for instance configured for vacuum skin packaging of the product where a thin film of plastic material is draped down on the product and intimately adheres to a top rim and to the inner surface of the support or tray, as well as to the product surface thus leaving a minimum, if any, amount of air within the packaging.

The apparatus 1 comprises a frame 10, a transport assembly 2 configured for displacing the support or tray 7, a roll supporting assembly 3, a film cutting assembly 4, a packaging assembly 5 and a vacuum arrangement 102 (visible in the schematic drawings of FIGS. 5a, 5b), such as a vacuum pump or the like. Of course the presence of a film cutting assembly is not essential with regard to the claimed invention: for instance the film may alternatively be directly supplied from the roll onto the support or tray without being pre-cut; in this case film cutting—if necessary—may take place after the film has been fixed to the support 7 and/or after air has been withdrawn from within the support 7. The support transport assembly 2 comprises a sliding plane 20 and a conveyor belt 21 arranged in slidable contact with the sliding plane 20. The support transport assembly 2 is carried by, e.g. fixed to, the frame 10 so that the sliding plane 20 is substantially horizontal and the conveyor belt 21 slides in contact with the sliding plane 20 in the horizontal direction indicated by the arrow A1 shown in FIG. 1. The transport assembly 2 arranged on the frame 10 is configured for displacing the support or tray 7 along a predefined path from a loading station 200, where supports or trays which may already be filled with the respective product(s) are positioned, to a packaging station 201, where the packaging assembly 5 operates in order to tightly fix a film sheet 61 to each support or tray 7, as it will be explained here below in detail. Note that the products may be positioned on the support or tray 7 either upstream the loading station 200 or in any location between the loading station and the packaging station 201.

Next to the frame 10 and in correspondence of the packaging station 201, the sliding plane 20 has an aperture 20a (visible e.g. in FIGS. 5a to 5h) suitable for being engaged by the packaging assembly 5, as it will be described in further detail hereinafter. The support transport assembly 2 further comprises a motor, e.g. a stepping motor unit 22, for operating the conveyor belt 21 with step-by-step movement. The roll supporting assembly 3 may comprise two rotating cylinders 31, 32 horizontally projecting from an upper part of the frame 10 and suitable for supporting a film roll 6. Optionally, the roll supporting assembly 3 may further comprise an arm 33 fixed to the frame 10 and suitable for preventing axial movement of the film roll 6. Further, the roll supporting assembly 3 (see FIG. 2) may comprise film punching devices 34 configured essentially to provide the correct profile to the film edges to match, when transversally cut in the cutting assembly 4, the shape of the tray mouth with rounded corners. The punching devices 34 may also help to keep an unrolled portion of film 60 pulled from the film roll 6 substantially vertically aligned. Alternatively, the film may be unwound from the film roll 6 and moved to a first pinch roll horizontally, instead of vertically as illustrated in the Figures. In such a case, the punching devices 34 may be positioned closer to the film roll 6, in the space between the film roll 6 and said first pinch roll, and rotated by 90° to punch the film while it is horizontal.

The film rolled on the film roll 6 may be made of a flexible multi-layer material comprising at least a first outer heat-sealable layer, an optional gas barrier layer and a second outer heat-resistant layer. The outer heat-sealable layer may comprise a polymer capable of welding to the inner surface of the supports carrying the products to be packaged, such as for instance ethylene homo- or co-polymers, like LDPE, ethylene/alpha-olefin copolymers, ethylene/acrylic acid copolymers, ethylene/methacrylic acid copolymers, and ethylene/vinyl acetate copolymers, ionomers, co-polyesters, e.g. PETG. The optional gas barrier layer preferably comprises oxygen impermeable resins like PVDC, EVOH, polyamides and blends of EVOH and polyamides. The outer heat-resistant layer may be made of ethylene homo- or copolymers, ethylene/cyclic-olefin copolymers, such as ethylene/norbornene copolymers, propylene homo- or co-polymers, ionomers, (co)polyesters, (co)polyamides. The film may also comprise other layers such as adhesive layers or bulk layers to increase thickness of the film and improve its mechanical properties. In one embodiment, one or more layers of the film are cross-linked to improve the strength of the film and/or its heat resistance. Cross-linking may be achieved by using chemical additives or by subjecting the film layers to an energetic radiation treatment. The film preferably has a thickness comprised between 50 microns and 200 microns, more preferably between 60 and 180 microns and even more preferably between 70 microns and 150 microns. The film preferably has a width substantially equal or few mm less to the width of the support carrying the product to be packaged.

The film cutting assembly 4 preferably comprises a cutting device 40 with a cutting blade 401 and a first piston 41. The first piston 41 may be replaced by any other kind of electric, pneumatic or hydraulic linear actuator. The first piston 41 is preferably fixed to the frame 10 underneath the roll supporting assembly 3 and is connected to the cutting device 40 so as to push and pull it in the horizontal direction indicated by the double arrow A2 shown in FIG. 3. The film cutting assembly 4 further comprises a backing block 42 and a second piston 43. The second piston 43 may be replaced by any other kind of electric, pneumatic or hydraulic linear actuator. The second piston 43 is preferably fixed to the frame 10 and is connected to the backing block 42 so as to push and pull it in the vertical direction indicated by the double arrow A3 shown in FIG. 3. The backing block 42 preferably comprises a backing plate 421 having a number of holes and a backing element 422 having a slit 423. The cutting device 40 and the backing block 42 are preferably arranged so that the unrolled portion of film 60 pulled from the film roll 6 lies between them.

Figure 3:
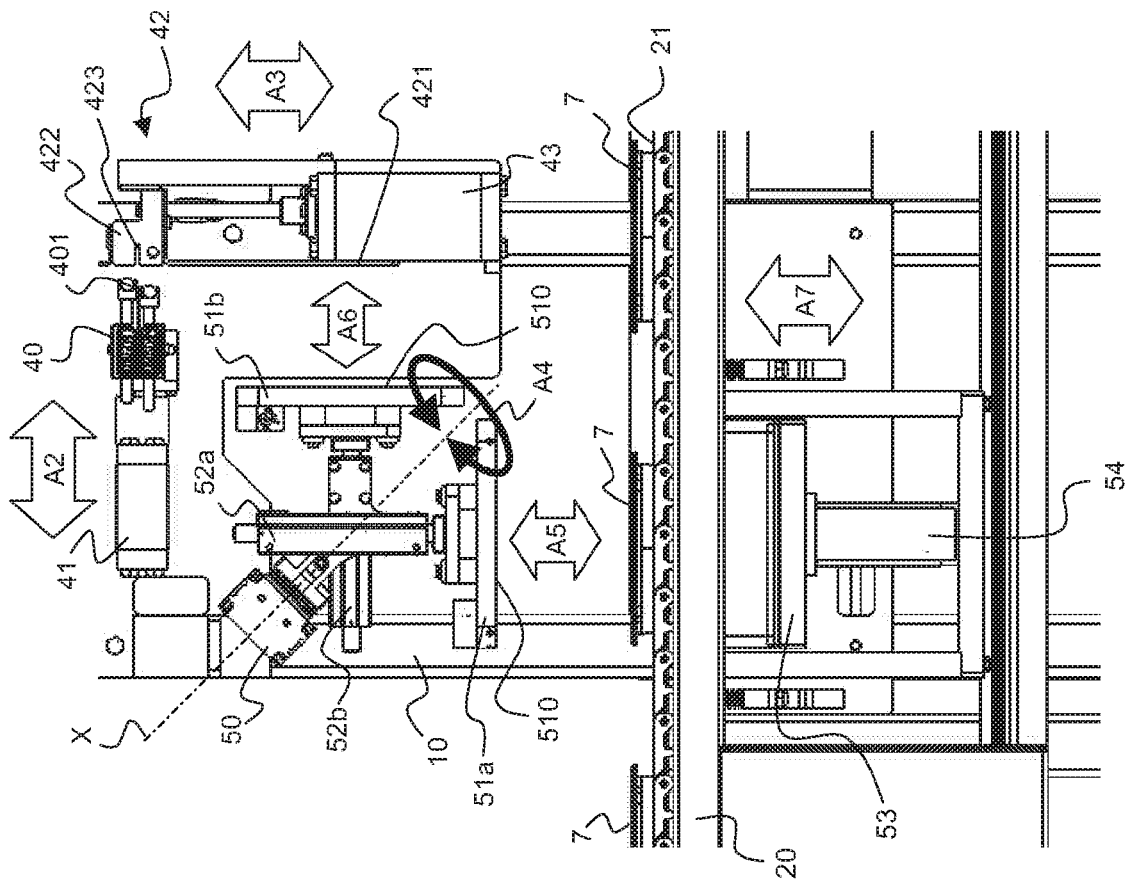
FIG. 3 is an enlarged view of a detail of FIG. 2.
Figure 4:
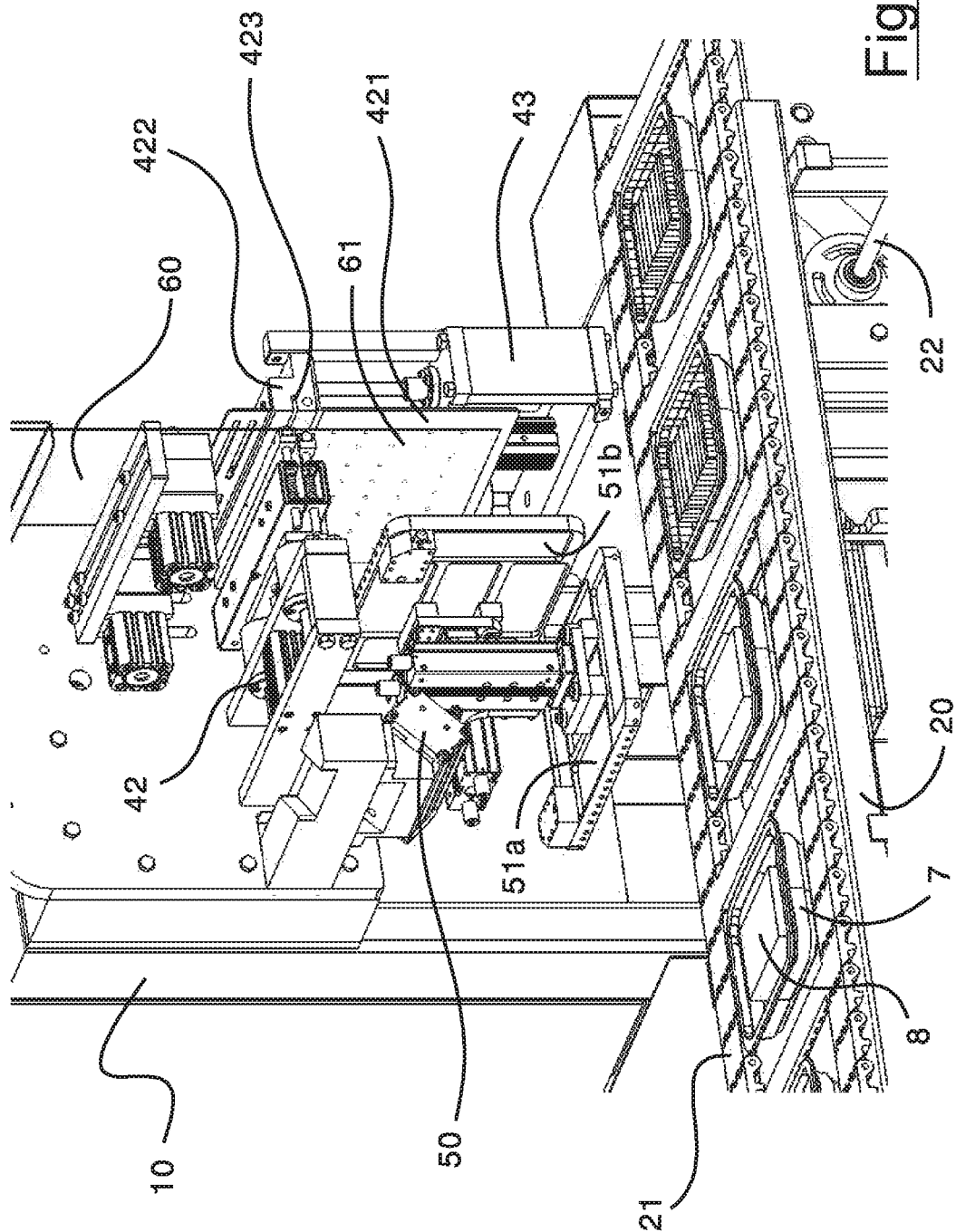
FIG. 4 is a perspective view of a portion of the apparatus of FIG. 1 during operation.

The packaging assembly 5 shown in FIGS. 1-4 comprises a rotating cylinder 50 mounted on the frame 10 and suitable for rotating about its axis X as indicated by the double arrow A4 shown in FIG. 3. The axis X preferably forms an angle of about 45° with the vertical direction. The rotating cylinder 50 may be replaced by any other kind of electric, pneumatic or hydraulic rotating actuator. Further, the packaging assembly 5 comprises two film transfer plates 51a, 51b and two third pistons 52a, 52b. The third pistons 52a, 52b may be replaced by any other kind of electric, pneumatic or hydraulic linear actuator. The third pistons 52a, 52b are connected to the rotating cylinder 50 so as to form a substantially right angle between them, i.e. one of the two third pistons (e.g. 52a) has its axis vertically oriented and the other one (e.g. 52b) has its axis horizontally oriented, as shown in FIG. 3. Each of the third pistons 52a, 52b is connected to a respective film transfer plate 51a, 51b so as to push and pull it along the direction indicated by the double arrows A5 and A6, respectively. By rotation of the rotating cylinder 50 about the axis X of an angle of about 180° (either in the clockwise or counterclockwise direction), the position of the two pistons 52a, 52b and the respective film transfer plates 51a, 51b may be exchanged. Each film transfer plate 51a, 51b may be provided with a heatable surface 510 and with at least one opening 520 (visible in FIGS. 5a to 5h) connected to the above mentioned vacuum arrangement 2. The transfer plates 51a and 51b are illustrated in the drawings as flat surfaces, according to a possible embodiment of the present invention. It may however also be foreseen to use shaped transfer plates, having an inner concavity with around flat edges corresponding to the rim of the support carrying the product to be packaged. This would have the advantage to allow also the packaging of products protruding from the support.

The packaging assembly 5 further comprises a base unit 53 and a fourth piston 54. The fourth piston 54 may be replaced by any other kind of electric, pneumatic or hydraulic linear actuator. The fourth piston 54 is fixed to the frame 10 underneath the sliding plane 20 and is connected to the base unit 53 so as to push and pull at least a part thereof in the vertical direction indicated by the double arrow A7 shown in FIG. 3 through the aperture 20a of the sliding plane 20.

Each of the transfer plates 51a, 51b (alternatively) forms a top unit which cooperates with the base unit 53 to define a holder 103 configured for keeping in a predetermined position the support 7 during perforation of the side wall of the support or tray 7. In fact, according to an aspect of the invention, the support or tray 7 is moved to the packaging station 201, kept in place by an holder 103 formed by base unit 53 and top unit 51a, 51b and then perforated to create one or more holes 70 on the side wall. In practice, the base unit 53 and the top unit (formed by plate 51a or plate 51b) are relatively movable such as to place a rim 7a of the support 7 and a corresponding portion 61a of the film sheet 61 in mutual contact between a heated surface of the top unit and an abutment surface of the base unit 53 (see the detail of FIG. 5i). The apparatus 1 comprises at least one perforating unit 100 having a perforating tool 101 operable between a rest position, where the tool 101 is spaced apart from the side wall of said support or tray 7, and an operating position, where the tool 101 acts on said support 7 and forms at least one though hole 70 in said side wall. More in detail, the or each perforating unit 100 (in FIGS. 5a to 5i two perforating units are shown but of course more than two perforating units can be provided) comprises an actuator 104 (which may be a pneumatic piston, an hydraulic piston or an electric actuator or other type of actuator) connected to the perforating tool 101 and configured for displacing the perforating tool 101 according to a prefixed direction of perforation DP intersecting the side wall of said support 7 when this latter is placed in said predetermined position.

Note that although e.g. FIG. 5c shows a horizontally moving perforating tool, each perforating unit may also be configured to move the perforating tool e.g. vertically, as shown in FIG. 5j: note that in this case the perforating tool may pierce an horizontal ledge formed by the side wall of tray or support 7 below the vertically top rim 7a.

Possible conformations of the perforating tool according to aspects of the invention are shown in FIGS. 8a-8c, 9a-9c, 9a'-9c', 10a-10c, 11a-11c, and 12a-12c. As shown in these figures, the perforating tool 101 has a pointed tip 105 configured for progressively contacting the side wall of the support 7 upon displacement of the perforating tool 101 from the rest position to the operating position: in practice the pointed tip moves in the direction of the tray or support 7 and is so shaped as to initially pierce the side wall at a very limited area, for instance in correspondence of a single point, and then progressively create a cutting line. In this connection, the pointed tip 105 presents one or more cutting edges 106: each cutting edge is defined by a sharp surface positioned in correspondence of borders of the tip 105.

The examples of FIGS. 8a-8c, 9a-9c and 9a'-9c' have one continuous cutting edge extending along a closed line and having a polygonal shape, e.g. a square or rectangular or rhomboidal (see sections in FIGS. 9b and 9b') or a rounded shape (see section in FIG. 8b). The cutting edge lies on a plane which is inclined by an angle α with respect to a longitudinal axis 110a of the tool 110. The utmost forward portion of the edge may define a cutting line (as in FIG. 9a) or a cutting point (as in FIG. 9a').

In the example of FIGS. 10a-10c, the tip comprises two cutting edges 106 converging to form a V shaped geometry (see FIG. 10a). The two converging cutting edges lie on a plane which is inclined by an angle α with respect to a longitudinal axis 110a of the tool 110 (FIG. 10c). The utmost forward portion of the tip where the two cutting edges converge defines a cutting point (FIGS. 10a, 10c). The converging cutting edges 106 terminate into surfaces 107 which, when the tip is inserted into the side wall of the support or tray 7 help keeping the flap 70a open (FIG. 10d). As shown in FIG. 10a, the two surfaces 107 may extend parallel to each other and to the axis 110a. As shown in FIG. 10d the tip may not define a hollow passage and air may thus be evacuated through window 105b defined by surfaces 107 and by the external surface of the side wall of support 7.

Figure 12C:
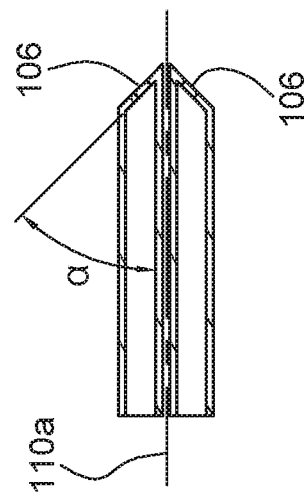
Figure 11B:
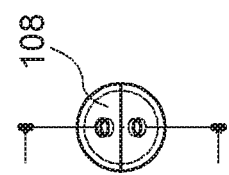

The examples of FIGS. 11a, 11c, 12a-12c have two cutting edges, each one being symmetrically disposed on a respective side of the tip 105 such that the tip presents perfect symmetry with respect to a plane of symmetry passing through longitudinal axis 110a of tool 110. Each one of the cutting edges 106 is inclined by an angle α with respect to a longitudinal axis 110a of the tool 110 (FIG. 12c).

Figure 22C:
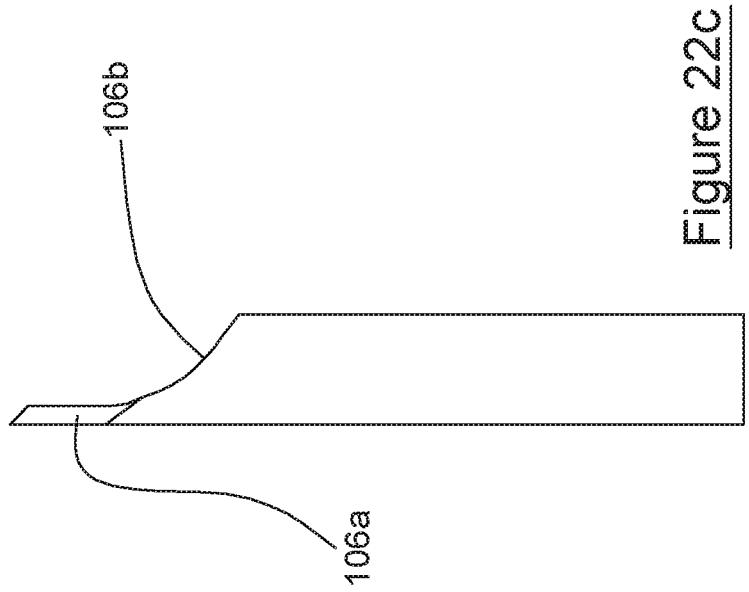
FIGS. 22a, 22b, 22c are respectively a top, side and front view of a further embodiment of a tip portion of the perforating unit according to another aspect of the invention.
Figure 22A:
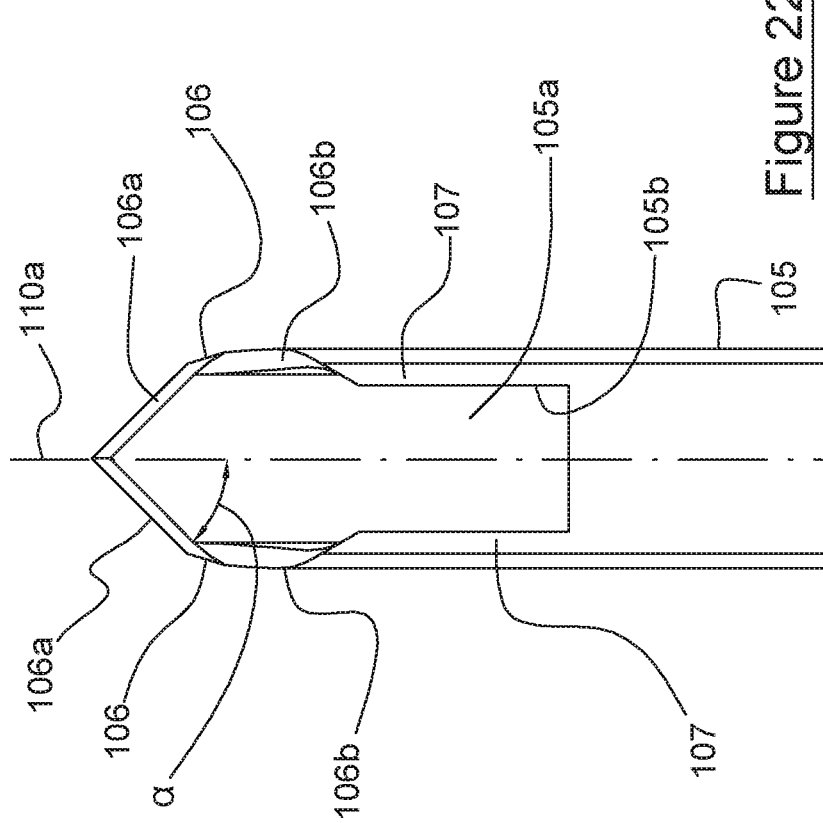
Figure 22B:
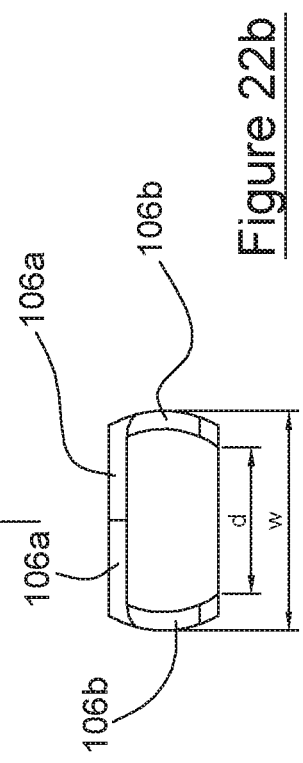
Figure 23:
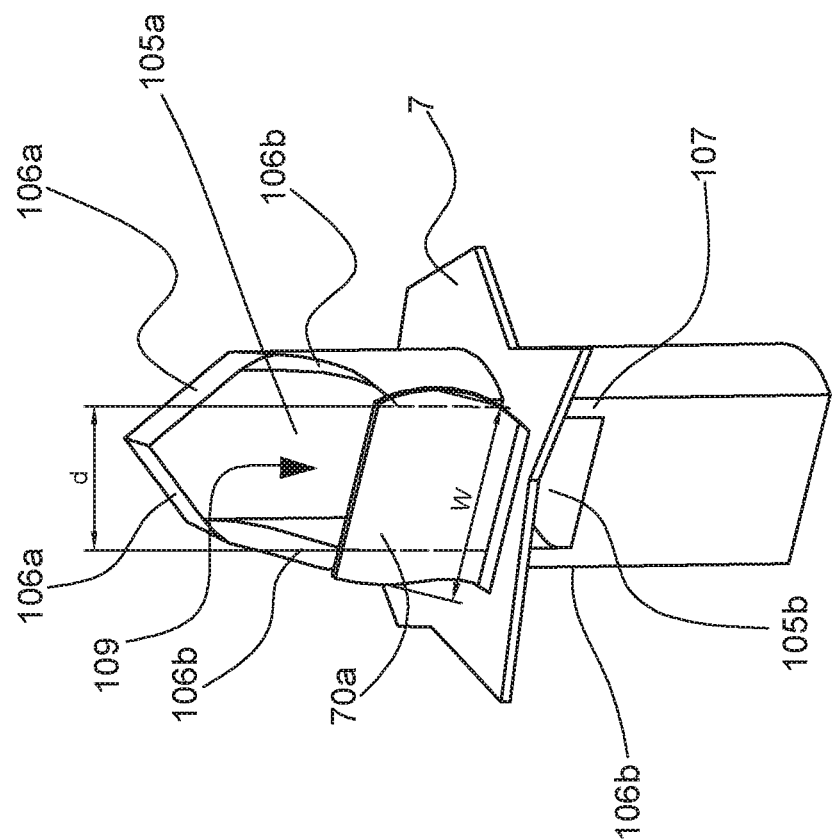
FIG. 23 is a perspective view of the tip portion of FIGS. 22a-22c in an operating condition where the tip portion perforates the side wall of a tray.
Figure 22D:
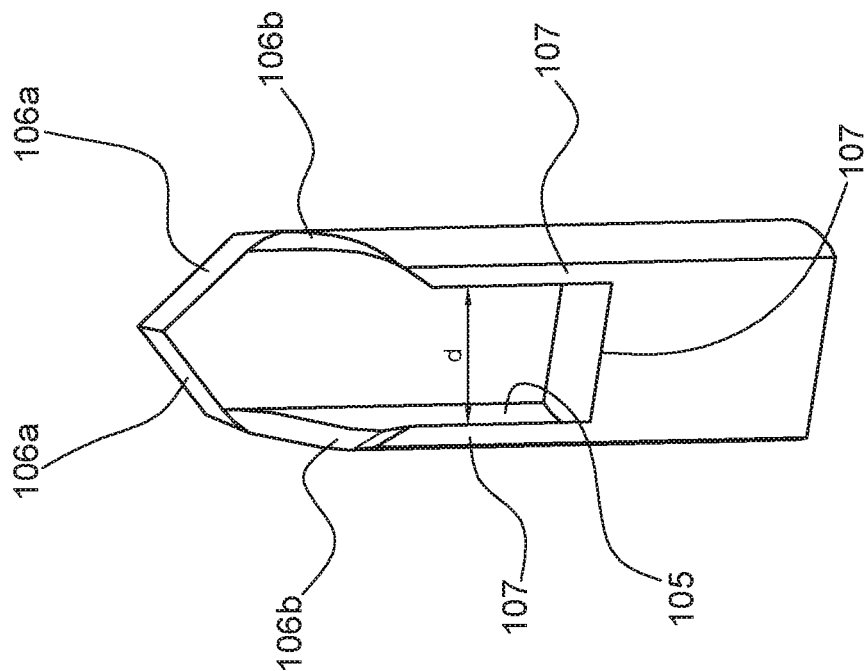
FIG. 22d is a perspective view of the tip portion of FIGS. 22a-22c.

A further embodiment of a tip 105 is shown in FIGS. 22a-22d and 23. In this embodiment, the tip comprises two cutting edges 106 having distal portions 106a converging to form a V shaped geometry (see FIG. 22a) at the distal end of tip 105. The two distal portions 106a of cutting edges 106 may be defined by side borders of a flat base 105a of tip 105 and may be inclined by an angle α with respect to a longitudinal axis 110a (again refer to FIG. 22a). The cutting edges also include two further portions 106b, adjacent to and in prosecution of the distal portions 106a, emerging from said base 105; in accordance with an aspect, the two further portions 106b are continuously joined to portions 106a and may progressively emerge from base 105a to form a substantially arc-shaped profile as visible in FIG. 106b. The portions 106 terminate into non cutting surfaces 107 which extend towards the proximal end of the tip 105 and delimit an aperture 105b facing base 105a. The non cutting surfaces 107 may extend substantially parallel to bottom surface 105a and to axis 110a. Furthermore, as shown in FIG. 23, the aperture 105b delimited by surfaces 107 axially extend parallel to axis 110a such that when the tip penetrates through the side wall of support or tray 7, flap 70a is kept open by forward portions of surfaces 107, while rearward portions of surfaces 107 define an aperture or window 105b of sufficient size to allow suction of air/gas coming from the inside of the tray. As shown in the view of FIG. 22b the portions 106b of cutting edges 106 may be arc-shaped and thus converge such that parallel surfaces are defined extending at a distance 'd' from each other which is smaller than the maximum distance 'w' between cutting edges 106: this, as shown in FIG. 23, provides the advantage that surfaces 107 may efficiently urge and keep flap in the open position, when tip 105 perforates the support side wall.

In the examples shown, the perforating tool 101 presents an elongated, e.g. straight, conformation and extends along the longitudinal axis 101a of prevalent development which is basically aligned with the direction of perforation DP. In all above examples the pointed tip 105 has cutting edges inclined relative to axis 110a and thus inclined relative to said prefixed direction of perforation DP, such that upon perforation of the side wall of the support 7, the pointed tip 105 progressively cuts a flap element in the side wall, as shown in FIG. 5i: advantageously (at least in connection with embodiments of FIGS. 9a', 10a, 22a) the cut may start substantially in correspondence of a single point and then propagate such that the perforation force may be minimized.

The flap element may be attached to an inferior portion of the side wall of support 7 or to a superior portion of the side wall of the support 7 (see FIGS. 13 and 14). Alternatively, if the perforating tools shown in FIGS. 11a, 11c, 12a-12c are used, two opposed flap elements may be created, as shown in FIG. 15.

In accordance with a further aspect, as shown in the example of FIG. 10a-10c and in the example of FIGS. 22a-22d, the tip 105 presents non cutting surfaces 107 extending parallel to each other in prosecution to the cutting edges 106 so as to define an aperture 105b which serves to such air/gas when the tip is inserted into the tray wall (see FIGS. 10d and 23). The non cutting surfaces 107 are axially displaced with respect to the distal end of the pointed tip 105 such that upon perforation of the side wall of the support 7, the pointed tip 105 cuts the flap element in the side wall and the non cutting surface help to urge said flap element in an open position. In the examples of FIGS. 8a-8c, 9a-9c, 9a'-9c', 11a-11c and 12a-12c, it is external side wall of the tip 105 which urges the flap element 70a into open position.

Figure 12B:
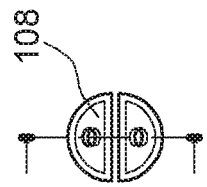
Figure 11A:
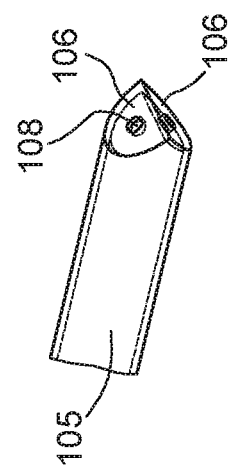
Figure 12A:
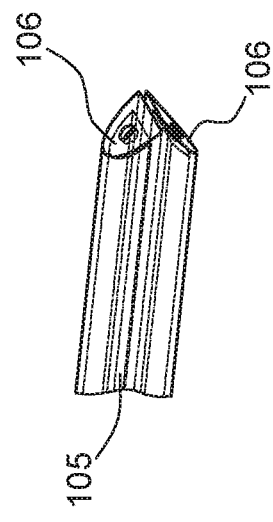

According to a further aspect of the invention the perforating tool 101 of each perforating unit may be in the form of a tubular needle having at least one inner lumen 108 (normally one lumen needle represents the most simple solution although in FIG. 12a-12c it is shown an embodiment of a multi-lumen needle). The lumen and the external surface of the needle may have circular, elliptic, or polygonal cross section: of course, other conformations may be equivalently suitable. The needle lumen 108 communicates with the tip aperture 109 which is delimited at least in part by cutting edges 106 and which is connected, to said vacuum arrangement 101 in order to pull air from the tip aperture 109 when the perforating tool is in the operating position.

Various alternatives may be envisaged depending upon whether the perforating tool is in the form of a hollow needle or not.

As schematically shown in FIG. 5*i*, in case the perforating tool is in the form of a hollow needle, the perforating tool 101 presents a suction aperture 110 which is axially spaced with respect to the tip aperture 109 such as to define a tubular tract 111, extending between the suction aperture and the tip aperture, which passes through passage 532 and through the thickness of the sidewall of the support 7 when the perforating tool is in the operating position. Note that in case actuator 104 is carried by outer fixed element 530, there may not be any passage 532 and thus needle may be entirely housed inside the volume internal to element 530.

Alternatively, in case the perforating tool is not a hollow needle (e.g. in case a tip as shown in FIGS. 22*a*-22*d* or 10*d* is used) instead of the suction aperture 110, window 105*b* on the side wall of tip 105 is used to suck air, as shown in FIGS. 5*k* and 23. This solution is particularly advantageous as it is possible to efficiently withdraw air as pressure drops are minimized. In any case tip 105 is axially connected to the stem of the actuator 104.

Under an operation point of view, air suction may be initiated when the perforating tool has crossed the passages 532 (if present), but not yet perforated the side wall of the support or tray 7. Suction is generated by vacuum arrangement 102, e.g. comprising a vacuum pump, connected to channels 530*a* and/or 530*b* conveniently located on the side wall and/or on the bottom wall of element 530 (see FIGS. 5*i*, 5*j*, 5*k*): this creates a difference of pressure between the inside of the support or tray 7 and the volume 300 defined between the base unit 53 and the outer surface of the tray or support 7; the pressure difference conveniently pushes the entire support 7 against the perforating tool(s) with consequent aid in the perforation process. In those embodiments where the actuator(s) 104 is/are located outside element 532, the sliding coupling of the perforating units through the respective passages 532 is preferably a tight fit sliding.

In the attached figures, the perforating unit 100 is carried by the frame and operates in correspondence of the packaging station 201 such as to form one or more holes in the side wall of the support(s) or tray(s) 7 present in the packaging station. Alternatively, the perforating unit 100 may operate in correspondence of a tray-holding station 400 (only schematically shown in FIG. 1) configured for holding in prefixed positions a number of empty supports 7; the tray-holding station may be located at or upstream the loading station: in this case, the perforating unit 100 may be configured to form at least one hole in the side wall of the one or more supports 7 located in the tray-holding station 400 (in this case the perforating unit may be carried by the frame 4 or by an independent own frame 401 of the tray holding station 400).

According to a further alternative, the perforating unit 100 may operate in correspondence of a tray-forming station (not shown) configured for forming, e.g. from a film, trays or supports 7; the tray-forming station may be located at or upstream the loading station.

Figure 5G:
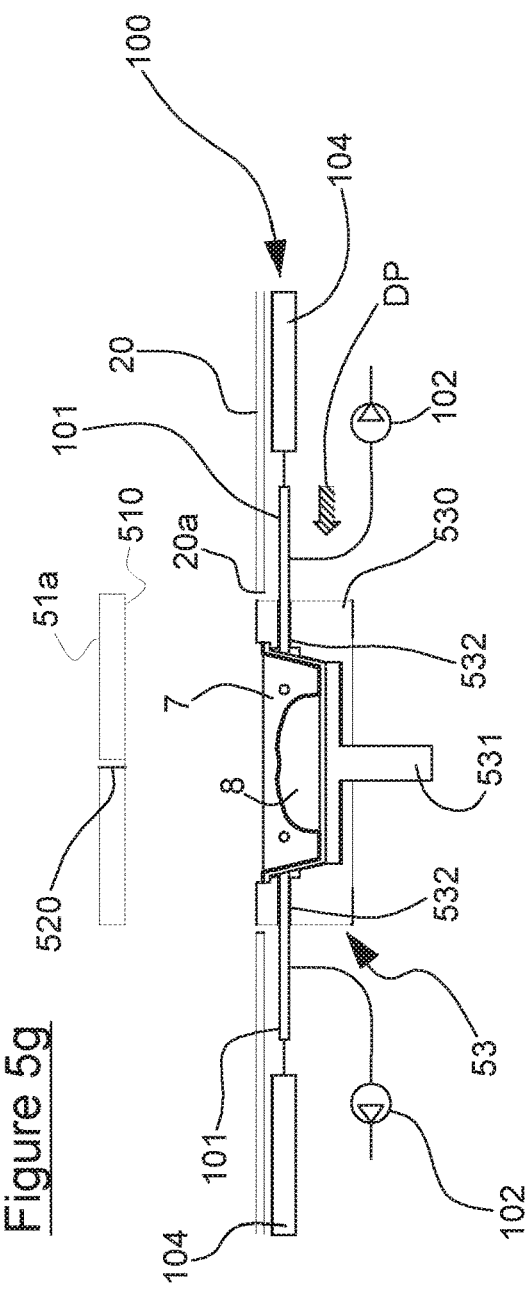

With reference to FIGS. 5*a* to 5*k*, the base unit 53 according to a first variant will be described in further detail. According to the first preferred variant, the perforating unit 100 is located at the packaging station and the base unit 53 preferably comprises an outer fixed element 530 and an inner slidable element 531. The outer fixed element 530 has a base and a sidewall defining a central cavity. The outer fixed element 530 is preferably provided with one or more through passages 532 for slidably receiving the perforating tool 101 of each perforating unit 100. In particular, the passages 532 are configured for matching with the position where holes 70 need to be placed on sidewalls of a tray supported by the inner slidable element 531 resting on the base of the outer fixed element 530; as mentioned above there may be no need of passages 532 in case the actuator or actuators 104 are carried by the element 530 in a manner that the perforating tool is directly emerging into volume 300. Air suction passages 530*a* and/or 530*b* may be positioned e.g. on the side wall or on the bottom wall of the outer fixed element 530, as illustrated in FIGS. 5*i* to 5*k*. The inner surface of the sidewall of the outer fixed element 530 is preferably conformed to fit the contour of the support on which the product to be packaged is arranged. The base of the outer fixed element 530 has a central hole. The outer fixed element 530 is optionally fixed to the frame 10 underneath the sliding plane 20. The inner slidable element 531 may have a base plate and a stem connected to the fourth piston 54 (not shown in FIGS. 5*a* to 5*k*) and engaging the central hole of the base of the outer fixed element 530. The inner slidable element 531 is slidable in the central cavity of the outer fixed element 530 by the fourth piston 54 between a first position (shown in FIGS. 5*a*, 5*b* and 5*h*) in which its base plate engages the aperture 20*a* of the sliding plane 20 and is substantially aligned with the sliding plane 20, and a second position (shown in FIGS. 5*c* to 5*g*) in which its base plate rests on the base of the outer fixed element 530.

The operation of the apparatus 1 according to the first embodiment, with the base unit 53 according to the first variant above described will be now described in detail.

Firstly, the heatable surface 510 of the film transfer plates 51*a*, 51*b* is heated to a predefined temperature. The predefined temperature is preferably between 190° C. and 230° C. It is assumed that the third pistons 52*a*, 52*b* with the film transfer plates 51*a*, 51*b* are initially in the configuration shown in FIG. 3, i.e. the third piston 52*a* has its axis vertically oriented and the third piston 52*b* has its axis horizontally oriented.

Then, the film cutting assembly 4 preferably starts cutting film sheets 61 from the unrolled portion of film 60 that is vertically aligned between the cutting device 40 and the backing block 42. In particular, before each cut, the second piston 43 preferably pushes the backing block 42 in the vertical direction indicated by the double arrow A3 shown in FIG. 3, until the backing element 422 faces the cutting device 40. Then, the unrolled portion of film 60 is drawn until it has a predefined length, preferably corresponding to the length of the tray or supports 7. This can be done by any conventional method such as for instance by means of an encoder, knowing the angular position of the rotating cylinder 31 and suitably controlling its movement to provide the predefined length of unrolled film. When the unrolled portion of film 60 has the predefined length, the first piston 41 preferably pushes the cutting device 40 in the horizontal direction indicated by the double arrow A2 of FIG. 3, until the cutting device 40 rests against the backing element 422 and the cutting blade 401 engages the slit 423, thus cutting a film sheet 61 whose width and length are equal to the width and length, respectively, of the support 7. After the film sheet 61 has been cut, the first piston 41 preferably pulls the cutting device 40 in the horizontal direction indicated by the double arrow A2 of FIG. 3, thereby moving the cutting device 40 away from the film sheet 61 and the backing element 422. Substantially at the same time, the second piston 43 preferably pulls the backing block 42 downwardly in the vertical direction indicated by the double arrow A3 shown in FIG. 3, until the backing plate 421 faces the film transfer plate 51b (as shown in FIG. 3). Substantially at the same time, vacuum is drawn through to the holes of the backing plate 421.

While the backing block 42 is pulled downwardly, the film sheet 61 is also pulled downwardly, since vacuum drawn through the holes of the backing plate 421 keeps the film sheet 61 integral therewith. Further, while the backing block 42 is pulled downwardly, the third piston 52b pushes the film transfer plate 51b in the horizontal direction indicated by the double arrow A6 until the film transfer plate 51b rests against the backing plate 421, with the film sheet 61 arranged between them.

Then, vacuum is applied between the heatable surface 510 of the film transfer plate 51b and the film sheet 61 by the vacuum pump through the at least one opening 520 of the film transfer plate 51b, while vacuum through the holes of the backing plate 421 is released. In this way, the film transfer plate 51b holds the film sheet 61 by adhesion, i.e. the film sheet 61 adheres to the heatable surface 510 of the film transfer plate 51b. As the film sheet 61 enters into contact with the heatable surface 510 (that, as mentioned above, is heated to the predefined temperature) it advantageously starts to heat and soften.

Then, while continuing to apply vacuum between the heatable surface 510 and the film sheet 61, the third piston 52b with its axis horizontally oriented preferably pulls the film transfer plate 51b along the direction indicated by the double arrows A6 of FIG. 3, so as to move it away from the backing plate 421. Due to vacuum, the film sheet 61 advantageously still adheres to the heatable surface 510.

In the meanwhile, products 8 to be packaged are arranged on respective supports 7, such as for instance trays. This can be done for instance at the loading station 200. Each support 7 preferably has a base, a sidewall and a top rim 7a outwardly projecting from the top edge of the side wall. In the example shown in Figures from 5a to 5i, the trays or support 7 have no holes until they reach the packaging station 201.

The trays or supports 7 are preferably made of a single-layer or a multi-layer thermoplastic material having gas barrier properties. Exemplary gas barrier single-layer thermoplastic materials are (co)polyesters, (co)polyamides and the like. Preferably, in case a multi-layer thermoplastic material is used, the multi-layer thermoplastic material preferably comprises at least one gas barrier layer and at least one heat-sealable layer to allow welding of the film sheet 61 to the surface of the support 7. Exemplary gas barrier polymers that can be employed for the gas barrier layer are PVDC, EVOH, (co)polyamides, (co)polyesters and blends thereof. Preferably, the heat-sealable layer is made of a polyolefin, such as ethylene homo- or co-polymers, e.g., in particular polyethylene, ethylene-[alpha]-olefin copolymers, and ethylene-vinyl acetate copolymers, propylene homo- or co-polymers, such as ethylene-propylene copolymers and ethylene-propylene-[alpha]-olefin terpolymers, and ionomers, or of homo- or co-polyesters, e.g. PETG (a glycol-modified polyethylene terephthalate). The multi-layer thermoplastic material may also comprise adhesive layers, to better adhere the gas-barrier layer to the adjacent layers. It may also comprise bulk layers to provide the structure with a sufficient thickness and/or with the desired mechanical properties. Chemically or physically foamed layers may be present in the support 7 particularly for use as bulk layers. Other layers may also be present—as known in the art—to provide the support 7 with certain desired properties, e.g., layers suitable to make the end package easy-to-open or to make it reclosable. The overall thickness of the single-layer or multi-layer thermoplastic material is preferably lower than 2 mm, and for instance may be comprised between 0.2 mm and 1.2 mm and even more preferably between 0.3 mm and 1.0 mm.

The supports 7 with the products 8 arranged thereon are then leaned on the sliding plane 20, so that the conveyor belt 21 makes them slide e.g. step-by-step along the sliding plane 20 in the direction indicated by the arrow A1 of FIG. 1a at the loading station 200 towards the packaging station 201. As shown in FIG. 5a, one of the supports 7 with a product 8 arranged thereon is sliding step-by-step along the sliding plane 20 under effect of the conveyor belt 21 (not shown in FIG. 5a), until it reaches the aperture 20a engaged by the base unit 53 and is accordingly arranged on the base plate of the inner slidable element 531.

While the conveyor belt 21 is bringing the support 7 on the base plate of the inner slidable element 531, the rotating cylinder 50 preferably rotates by 180° about is axis X, so that the positions of the film transfer plates 51a, 51b are exchanged. Accordingly, the third piston 52b has now its axis vertically oriented and the film transfer plate 51b holding the film sheet 61 is now above the support 7 and the product 8 (see FIG. 5b). Vacuum applied between the heatable surface 510 of the film transfer plate 51b and the film sheet 61 is symbolically represented by the arrow A8.

The inner slidable element 531 is then moved downwardly by the fourth piston 54, in the vertical direction indicated by the arrow A7 of FIG. 3, until its basement rests on the base of the outer fixed element 530 (see FIG. 5c).

Then, while continuing to apply vacuum between the heatable surface 510 and the film sheet 61, the third piston 52 pushes downwardly the film transfer plate 51b (which in this case represent the upper element of the holder 103) along the vertical direction indicated by the arrow A5 of FIG. 3, until the heatable surface 510 engages the rim of the support 7 carried by the outer fixed element 530 of the base unit 53 and the film sheet 61 covers the aperture of the support 7, as shown in FIG. 5d. Preferably, the edges of the film sheet 61 are fixed to the rim of the support 7 in an airtight manner by the pressure of the film transfer plate 51b.

Then, vacuum or a state of low pressure is created in the volume 300 between the inner surface of element 53 and the outer surface of support or tray 7, by actuating suction pump 102 which—via apertures 530a, 530b. Substantially at the same time or subsequently, the perforating unit 100 (or units) is activated to displace the perforating tool 101 from the rest position to the operating position, creating at least one though hole 70 on said support side wall thereby forming a passage placing the interior of the support or tray 7 in fluid communication with volume 300 and thereby with the vacuum pump 102; it should be noted that if the tip is in the form of a needle suction from the interior of the tray or support 7 takes place through the needle cavity via suction aperture 110 and pump 102; in the case where the tip is not hollow (FIGS. 10d and 23) suction from the inside of the tray or support 7 takes place through the tip window 105b. As mentioned air suction through passages 530a and/or 530b may be initiated when the perforating tool has not yet perforated the side wall of the support or tray 7 (see FIG. 5i): this condition creates a difference of pressure between the inside of the support or tray 7 and the volume 300 defined between the base unit 53 and the outer surface of the tray or support 7; the pressure difference acts as a contrast pushing the entire support against the inner surface of base unit and against the perforating tool(s) with consequent aid in the perforation process. In a second phase, the perforating tool progressively perforated the side wall of the tray or support forming a flap element as shown in FIGS. 13-15. Note that in case of a plurality of perforating units, said units may be synchronously controlled in order to simultaneously pierce the side wall of the support or tray 7 in respective distinct locations. A single actuator 104 may be used to move a plurality, e.g. all, the perforating units 101.

Once the perforating tool has created hole or holes 70 and reached its operating position, air is removed from within the support or tray 7 by means of the vacuum pump 102, through the just created holes 70 and the lumens 108 and aperture 110 or via windows 105b, as schematically indicated by the arrows A9 in FIG. 5e. This advantageously creates vacuum (i.e. it lowers pressure) within the support 7 underneath the film sheet 61. It can be noticed that, even if vacuum is created underneath the film sheet 61, the film sheet 61 may still adhere to the heatable surface 510. This is due to the fact that the low pressure created between the heatable surface 510 and the film sheet 61 is lower than the low pressure created underneath the film sheet 61.

After a predefined low pressure is reached within the support 7 underneath the film sheet 61 (typically in the range of up to 50 mBar, preferably comprised between 3 and 40 mBar, more preferably between 5 and 30 mBar and even more preferably in the range of 10-20 mBar), air is reintroduced between the heatable surface 510 and the film sheet 61 through the at least one opening 520 of the film transfer plate 51b, as indicated by the arrow A8 of FIG. 5f. Air may be reintroduced either immediately after the predefined low pressure is reached, or after a predefined extra-time. Alternatively, air is reintroduced when a predefined time has expired (typically between 0.5 and 2.5 s and preferably between 1 and 2 s). The film sheet 61 then ceases to adhere to the heatable surface 510 and is drawn downwardly by the vacuum within the support 7. While the film sheet 61 is drawn downwardly, the vacuum pump preferably continues removing air from the support 7 through the holes 70. Advantageously, the film sheet 61 moving downwards in the support 7 helps air exiting from the support 7 through the holes 70. Since the film sheet 61 is heated (and then softened), under effect of the vacuum within the support 7 it deforms so as to adhere to the product 8 and to the inner surface of the support 7, as shown in FIG. 5f. Removal of air from within the support 7 may advantageously continue until the holes 70 are closed by the film sheet 61. Note that in order for the film sheet to close the holes the perforating tool is retracted in the position shown in FIG. 5f where the pointed tip is housed in the passages 532 or at least at a position where the pointed tip is not protruding from the inner surface of the support or tray 7. As soon as the film sheet 61 closes the holes 70 by adhering to the inner surface of the support 7, also bringing the flap elements in closure of the respective holes, removal of air from within the support 7 is prevented. When removal of air from within the support 7 is prevented, evacuation of the package ends.

The film transfer plate 51b is then pulled in the vertical direction indicated by the arrow A5 of FIG. 3 by the third piston 52b, thereby moving it away from the base unit 53 (see FIG. 5g).

Figure 5H:
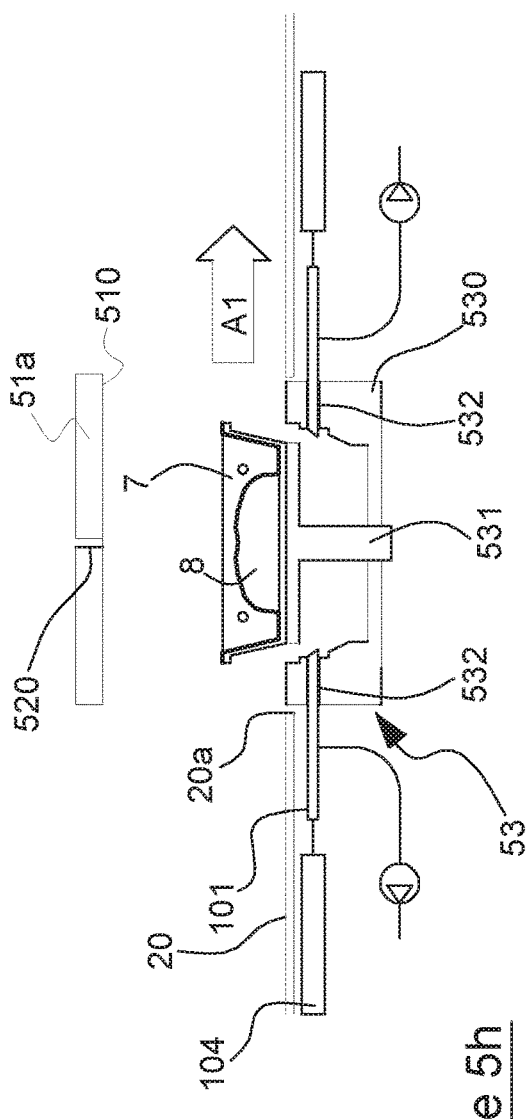

Vacuum is released from below the support 7 and then the fourth piston 54 preferably pushes the inner slidable element 531 of the base unit 53 in the vertical direction indicated by the arrow A7 of FIG. 3, until the inner slidable element 531 is again substantially aligned with the sliding plane 20 (see FIG. 5h). In this way, the support 7 may continue sliding step-by-step along the sliding plane 20 in the horizontal direction indicated by the arrow A1 under effect of the conveyor belt 21.

The operation of a single film transfer plate 51b has been taken into account in the above description because the apparatus 1 may include one single transfer plate. Indeed, in a possible variant, the apparatus 1 of FIGS. 1-4 may include one single transfer plate. In this case the apparatus would be less performing compared to a solution as the one of FIGS. 1-4 in that the single transfer plate during a first time period would have to cooperate with the unrolled portion of film 60 in order to separate a prefixed film portion and during a second time period with the base unit 53 in order to seal the film and allow air evacuation. Apart from this the structure and working of the apparatus 1 would not significantly change.

However, in the apparatus 1 of FIGS. 1-4 two film transfer plates 51a, 51b are operated simultaneously. Their operation is preferably synchronized as follows.

While the film transfer plate 51b is involved in the operations of FIGS. 5d to 5f (i.e. it is in contact with the base unit 53), the film cutting assembly 4 cuts a further film sheet as described above (the backing block 42 is pushed upwardly until the backing element 422 faces the cutting device 40, the cutting device 40 is horizontally pushed against the backing element 422 thus cutting the further film sheet, the cutting device 40 is moved away from the backing element 422 and the backing block 42 is pulled downwardly until the backing plate 421 faces the film transfer plate 51a, the film transfer plate 51a is pushed against the backing plate 421 with the further film sheet arranged between them, vacuum is applied between the heatable surface of the film transfer plate 51a and the further film sheet so that the film transfer plate 51a holds the further film sheet, and the film transfer plate 51a holding the further film sheet is moved away from the backing plate 421. Successively, the film transfer plate 51b is preferably moved away from the base unit 53 (FIG. 5g) and the support 7 is raised at the level of the sliding plane 20 (FIG. 5h). Then, e.g. with a single step of the stepping motor unit 22, the conveyor belt 21 removes the support 7 from the base unit 53 and brings a further support with a further product on the inner slidable element 531 of the base unit 53. The further support is brought on the inner slidable element 531 and said element 531 is lowered, while the rotating cylinder 50 preferably rotates by an angle of about 180° about its axis X, thereby exchanging the positions of the film transfer plates 51a, 51b. The heating surface 510 is then lowered to engage the rim of the support 7 carried by the outer fixed element 530 of the base unit 53. Consequently, the film transfer plate 51a holding the further film sheet is now above the further support or tray 7 and acts as top unit of holder 103. The operations shown in FIGS. 5d to 5h are then repeated to provide for a further product packaged according to the vacuum skin package technique.

The operation of the apparatus 1 cyclically repeats according to the above synchronism, thereby implementing vacuum skin packaging on a number of supports 7 with respective products 8 loaded thereon that are sequentially provided onto the sliding plane 20.

The above described machine has a number of advantages.

First of all, providing the holes 70 in the support 7 advantageously allows removing air from within the support 7 underneath the film sheet 61 even after the film 61 is brought into airtight contact with the rims of the support 7. This advantageously allows removing more air from within the support 7, thereby minimizing the amount of residual air left in the support 7 at the end of the vacuum skin packaging process, and accordingly minimizing the risk of forming air pockets. Further, suction of air via holes 70 and either windows 105b or suction apertures 110 results in a very efficient evacuation process because the just created hole perfectly fits to the shape of the perforating tool and suction may be exerted directly or in close proximity to the inner volume of the support or tray where needed. Also, the described apparatus allows to create an optimal vacuum condition in volume 300 even before actual formation of the holes 70 and furthermore air removal from the support 7 is made possible even after the film sheet 61 is released from the heatable surface 510 of the film transfer plate 51b. This advantageously allows to efficiently carry out the perforation step and to reduce the residual amount of air inside the package at the end of the vacuum skin packaging process. Moreover, at the end of the process, the flap elements are brought back in alignment with the respective side wall thus providing the package with an appreciable continuity in the outer surface of the tray or support 7. Additionally the use of a flap which remains integral part of the tray results in no risk of plastic inside the pack, thereby minimizing risks of contamination.

Furthermore, the perforating unit may easily be implemented on existing apparatus thereby avoiding the need to have pre-holed trays.

According to a second variant of the first embodiment, the base unit 53' preferably comprises an outer element 530', a fixed base plate 531' and an adapter 534' with, e.g. four, leveling feet 533'. The fixed base plate 531' is connected to a fixed stem 540 of the third piston 54 and has four passing holes (not visible in the drawings). The adapter 534' leans on the fixed base plate 531' with the four leveling feet 533' engaging the passing holes and projecting on the lower side of the fixed base plate 531'. In an alternative variant not shown in the drawings, the adapter 534' may be configured so that, when it leans on the fixed base plate 531', the four leveling feet 533' are external to the fixed base plate 531' and they project on the lower side of the fixed base plate 531'. The fixed base plate 531' and the adapter 534' engage the aperture 20a of the sliding plane 20 so that upper surface of the adapter 534' is aligned with the sliding plane 20. The outer element 530' has a base and a sidewall defining a central cavity. As in the previously described embodiment, depending upon the location of actuator(s) 104, the base may or not present one or more passages suitable for receiving perforating tools of perforating units 100. As described for the variant of FIGS. 5a-5k, each perforating unit has a perforating tool 101 operable between a rest position, where the tool 101 is spaced apart from the side wall of said support or tray 7, and an operating position, where the tool 101 acts on said support 7 and forms at least one though hole 70 in said side wall. More in detail, the or each perforating unit 100 comprises an actuator 104 (which may be a pneumatic piston, an hydraulic piston or an electric actuator or other type of actuator) connected to the perforating tool 101 and configured for displacing the perforating tool 101 according to a prefixed direction of perforation DP intersecting the side wall of said support 7 when this latter is blocked in position by base unit 53' and plate 51a, 51b. Alternatively, a single actuator may be used to move a plurality of perforating units.

Figure 6E:
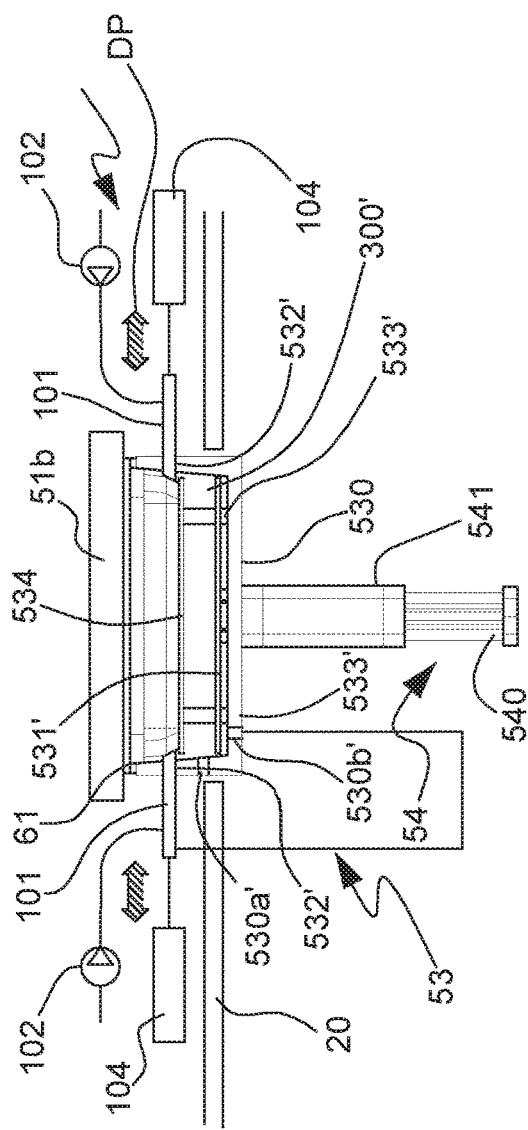

Note that although e.g. FIG. 6e shows a horizontally moving perforating tool, each perforating unit may also be configured to vertically displace the perforating tool, as shown in FIG. 5j: note that in this case the perforating tool may pierce a horizontal ledge formed by the side wall of tray or support 7 vertically below the top rim of the support or tray.

In case actuator(s) 104 is located externally of outer element 530', this latter may be provided with one or more through passages 532' for slidably receiving the perforating tool 101 of each perforating unit 100. They may be positioned e.g. on the bottom (not shown in the figures) of the outer fixed element 530' or, as illustrated in FIG. 6e, in the thickness of the sidewall of the outer element 530' in correspondence of a top zone of the lateral wall of tray or support 7. In particular, the passages 532' are configured for matching with the position where holes 70 need to be placed on sidewalls of a tray.

Possible conformations of the perforating tool according to aspects of the invention are shown in FIGS. 8a-8c, 9a-9c, 9a'-9c' 10a-10d, 11a-11c, 12a-12c and 22a-22d, and are not further described as a corresponding detailed description has already been provided herein above with reference to the first variant.

The central cavity of the outer element 530' is preferably dimensioned to allow the fixed base plate 531' and the adapter 534' to slide in the central cavity. The base of the outer element 530' is preferably connected to a movable cylinder 541 of the third piston 54.

The operation of the apparatus 1 with the base unit 53' according to the second variant will be now described in detail. Since the operations that do not involve the base unit 53' are substantially the same as the corresponding operations performed by the machine with the base unit 53 according to the first variant, such operations will be only briefly summarized, while a detailed description thereof will not be repeated.

Firstly, the heatable surface 510 of the film transfer plates 51a, 51b is heated to a predefined temperature. Then, the film cutting assembly 4 preferably starts cutting film sheets 61 from the unrolled portion of film 60 as described above (before each cut, the backing block 42 is pushed upwardly until the backing element 422 faces the cutting device 40, the cutting device 40 is horizontally pushed against the backing element 422 thus cutting a film sheet 61, the cutting device 40 is moved away from the backing element 422 and the backing block 42 is pulled downwardly until the backing plate 421 faces the film transfer plate 51b). Then, the film transfer plate 51b is pushed against the backing plate 421 with the film sheet 61 arranged between them, vacuum is applied between the heatable surface of the film transfer plate 51b and the film sheet 61 so that the film transfer plate 51b holds the film sheet 61, and the film transfer plate 51a holding the film sheet 61 is moved away from the backing plate 421.

In the meanwhile, products 8 to be packaged are arranged on respective supports 7. The supports 7 with the products 8 arranged thereon are then leaned on the sliding plane 20, so that the conveyor belt 21 makes them slide, e.g. step-by-step, along the sliding plane 20 in the direction indicated by the arrow A1 of FIG. 1a.

As shown in FIG. 6a, one of the supports 7 with a product arranged thereon (not visible in FIG. 6a) is sliding along the sliding plane 20 under effect of the conveyor belt 21 (not shown in FIG. 6a), until it reaches the aperture 20a engaged by the base unit 53' and is accordingly arranged on the adapter 534'.

While the conveyor belt 21 is bringing the support 7 on the adapter 534', the rotating cylinder 50 preferably rotates by 180° about is axis X, so that the positions of the film transfer plates 51a, 51b are exchanged. Accordingly, the third piston 52b has now its axis vertically oriented and the film transfer plate 51b holding the film sheet 61 is now above the support 7 and the product 8 (see FIG. 6b). The outer element 530' is then moved upwardly in the vertical direction indicated by the arrow A7 of FIG. 3 by the moving cylinder 541 of the fourth piston 54, until the outer element 530' touches the rim of the support 7 and the leveling feet 533' of the adapter 534' rests on the base of the outer element 530' (see FIG. 6c).

Then, the outer element 530' is further moved upwardly in the vertical direction indicated by the arrow A7 of FIG. 3 by the moving cylinder 541 of the fourth piston 54, thus raising the adapter 534' (and the support 7 resting on it) and detaching it from the fixed base plate 531'. The stroke of the outer element 530' ends when the fixed base plate 531' leans against the base of the outer element 530' (see FIG. 6d).

Then, the film transfer plate 51b holding the film sheet 61 is pushed downwardly until the film sheet 61 covers the aperture of the support 7 (as shown in FIG. 6e), the edges of the film sheet 61 being fixed to the rim of the support 7 in a airtight manner.

Then, vacuum or a state of low pressure is created in the volume 300' between the inner surface of element 53' and the outer surface of support or tray 7, by actuating suction pump 102, via apertures 530a', 530b'. Substantially at the same time or subsequently, the perforating unit 100 (or units) is activated to displace the perforating tool 101 from the rest position to the operating position, creating at least one though hole 70 on said support side wall thereby forming a passage placing the interior of the support or tray 7 in fluid communication with volume 300' and thereby with the vacuum pump 102; it should be noted that if the tip is in the form of a needle suction from the interior of the tray or support 7 takes place through the needle cavity via suction aperture 110 and pump 102; in the case where the tip is not hollow (FIGS. 10d and 23) suction from the inside of the tray or support 7 takes place through the tip window 105b. As mentioned air suction through passages 530a' and/or 530b' may be initiated when the perforating tool has not yet perforated the side wall of the support or tray 7: this condition creates a difference of pressure between the inside of the support or tray 7 and the volume 300' defined between the base unit 53 and the outer surface of the tray or support 7; the pressure difference acts as a contrast pushing the entire support against the inner surface of base unit and against the perforating tool(s) with consequent aid in the perforation process. In a second phase, the perforating tool progressively perforated the side wall of the tray or support forming a flap element as shown in FIGS. 13-15. Note that in case of a plurality of perforating units, said units may be synchronously controlled in order to simultaneously pierce the side wall of the support or tray 7 in respective distinct locations. A single actuator 104 may be used to move a plurality, e.g. all, the perforating units 101.

Once the perforating tool has created hole or holes 70 and reached its operating position, air is removed from within the support or tray 7 by means of the vacuum pump 102, through the just created holes 70 and the lumens 108 and aperture 110 or via windows 105b.

Figure 6F:
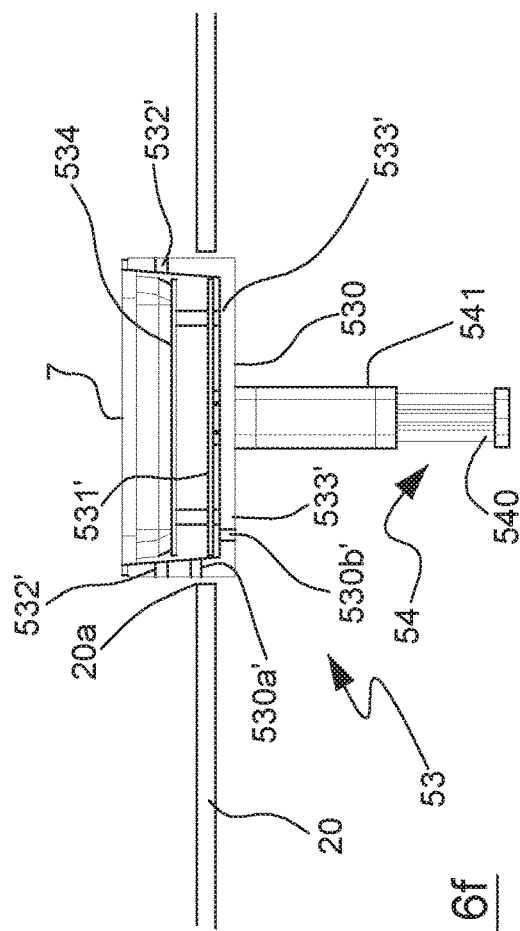

Following re-venting through the film transfer plate 51b, the film transfer plate 51b is pulled in the vertical direction indicated by the arrow A5 of FIG. 3 by the third piston 52b, thereby moving it away from the base unit 53 (see FIG. 6f), and vacuum in the outer element 530' is released.

Then, the outer element 530' is moved downwardly in the vertical direction indicated by the arrow A7 of FIG. 3 by the moving cylinder 541 of the fourth piston 54, thus lowering the adapter 534' (and the support 7 resting on it) and bringing it again into contact with the fixed base plate 531' (see FIG. 6g).

The outer element 530' is then further moved downwardly in the vertical direction indicated by the arrow A7 of FIG. 3 by the moving cylinder 541 of the fourth piston 54, until the outer element 530' disengages the aperture 20a of the sliding plane 20 and the support 7 (see FIG. 6h). In this way, the support 7 may continue sliding along the sliding plane 20 in the horizontal direction indicated by the arrow A1 under effect of the conveyor belt 21.

Also according to this second variant, the two film transfer plates 51a, 51b may be operated according to the synchronism described above or alternatively the apparatus may include one single transfer plate 51a.

As a further variant of first embodiment, instead of a continuous film of the suitable width which is cut in film sheets to the predefined length matching the tray mouth, it is also possible to use pre-cut film sheets of the suitable dimensions (width and length and shape). Said pre-cut film sheets may be stacked and taken up, one at a time, by the film transfer plate or plates 51a and 51b and used in the packaging process described above. In such a case, a suitable configuration of the packaging assembly 5 (not shown in the drawings) may foresee that the film transfer plate or plates 51a, 51b are arranged parallel to the base unit 53 and they are moved vertically by relative pistons that allow said film transfer plate or plates 51a, 51b to be raised and lowered as needed. In case the apparatus includes two plates, the pistons may be connected to a cylinder rotating about a vertical axis, so as to horizontally displace the pistons with the film transfer plates 51a, 51b. This alternative packaging assembly may run the following steps: lowering a first film transfer plate (designed as 51a above) over the stack of pre-cut film sheets, applying vacuum through the first film transfer plate 51a to take up the top film sheet of the stack, raising the first film transfer plate 51a with the pre-cut film sheet adhered thereto, rotating the cylinder by a suitable angle to bring said first film transfer plate 51a over a base unit 53 and at the same time a second film transfer plate 51b above the stack of pre-cut film sheets, and lowering the first film transfer plate 51a to carry out a vacuum skin packaging process as described above. The perforating units would be located and operate as above described.

Second Embodiment of Apparatus 1

Figure 7:
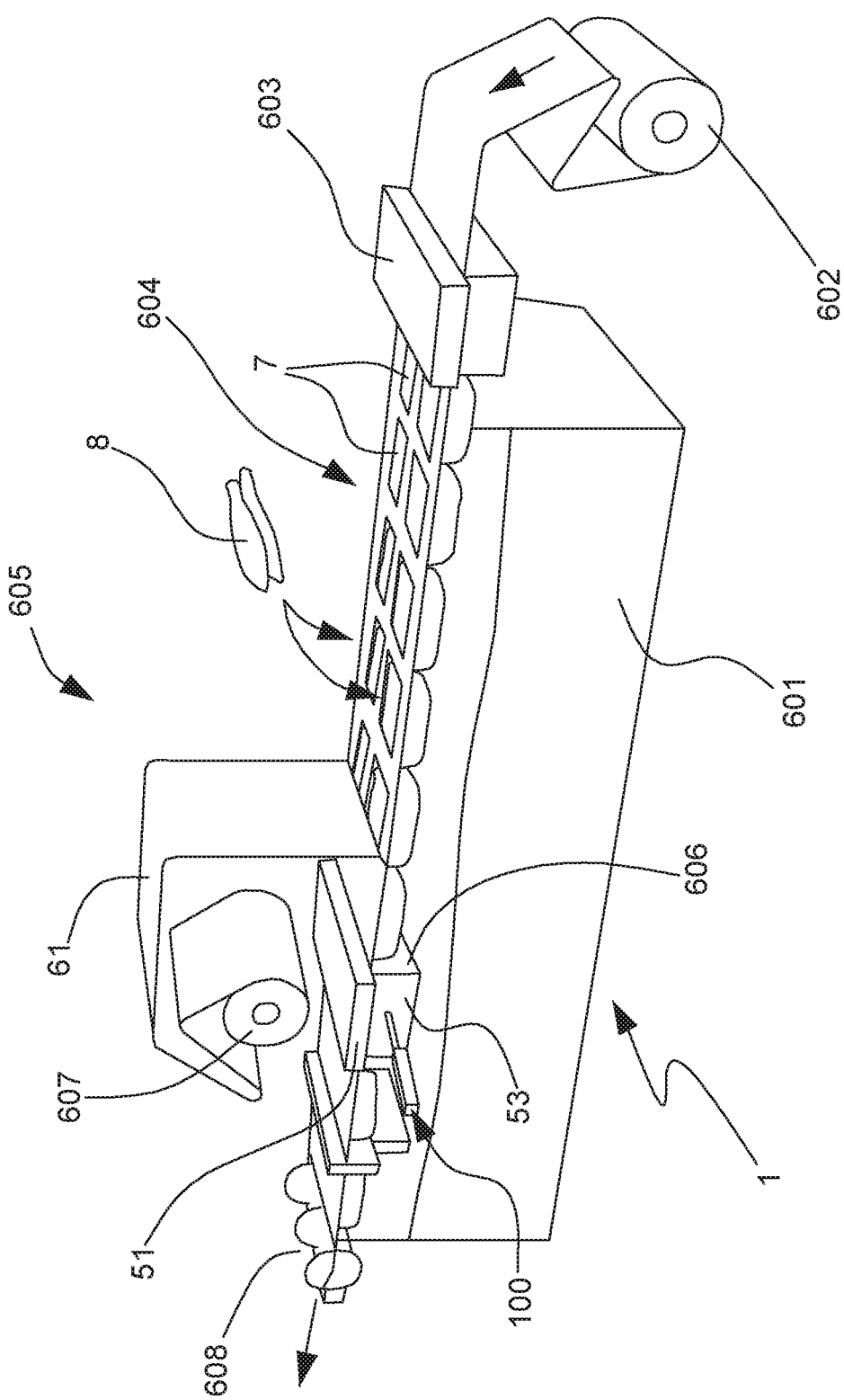
FIG. 7 is a perspective view of another apparatus according to a second embodiment of the present invention with certain components only schematically represented.
Figure 11C:
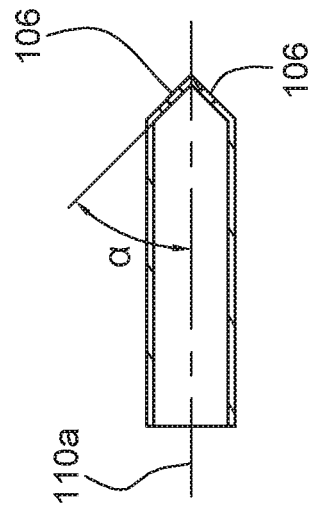

According to a further variant of the invention, the apparatus 1 may be of type disclosed in FIG. 7. FIG. 7 schematically shows an apparatus 1 having a frame 601.

Material in the form of a plastic web (thermoformable film) is unwound from the reel 602 carried by the frame 601 or by a structure associated to frame 601 and moved to a forming die 603. The plastic material is heated in the forming die and formed into trays 7. The formed trays 7 are loaded manually or automatically with a product and then transferred by a transport assembly 604 to a packaging station 605 where a packaging assembly 606 carried by the frame tightly fixes a film sheet 61 (lid film) which is unrolled from film supply roll 607: the film sheet 61 covers the filled trays 7. Note that the transport assembly 604 may include a conveyor and a sliding plane as described for the example of FIGS. 1-4. At the packaging station, a holder 103 of packaging station 606 maintains in proper position the tray 7. The holder 103 may have a base unit 53 of the type shown in FIGS. 5a-5i and a top unit 51 comprising a heating plate. The base unit and the top unit may be relatively displaceable in a vertical direction in order to sandwich and block a horizontal rim of the tray and a portion of the film sheet as shown in FIG. 5i. The packaging assembly keeps in position the tray 7 and allows application of the film sheet unrolled from reel 602. At least one perforating unit 100 having a perforating tool 101 operable between a rest position, where the tool 101 is spaced apart from the side wall of said support 7, and an operating position, where the tool 101 acts on said support 7 and forms at least one though hole 70 in said side wall while the tray is held in position at the packaging station. The perforating unit may be of the type above described with reference again to FIGS. 5a-5i and to the description thereof. The air is evacuated from the tray, e.g. via a lumen provided in each of the perforating tool(s). Then or contemporaneously, the pack is sealed. Downstream the packaging station there may be a cutting unit 608 separating the trays from one another.

Control Unit of Apparatus 1

The apparatus according to the invention has of at least one control unit.

The control unit 120 (schematically represented in FIG. 1) is at least connected to the transport assembly 2, the packaging assembly 5, the perforating unit 100 and the vacuum arrangement 101 and is configured for commanding the transport assembly 2 to displace said support 7 along the predefined path, e.g. by controlling the motor 22 according to a step-by-step motion; the control unit also commands the packaging assembly 5 and thus all the actuators described above in order to tightly fix the film sheet 61 to said support 7 when this latter has reached the packaging station; furthermore, the control unit commands the perforating unit or units 100 to displace the perforating tool 101 from the rest position to the operating position (and vice versa once the desired vacuum level has been reached) thereby creating at least one though hole 70 on said support side wall; furthermore the control unit is connected and controls the vacuum arrangement (vacuum pump 102) to remove air from within said support 7 underneath said film sheet 61 through said at least one hole 70. The above actions are executed by the control unit with the aid of sensors which are per se known and thus not further described. For instance, with the aid of position sensors the control unit 120 may determine when the support 7 is positioned in the base unit 53 of the packaging assembly 5 and command displacement of the perforating tool 101 from the rest position to the operating position only after the support 7 is properly positioned in the base unit 53. The control unit may also be configured to determine when the perforating tool 101 has reached the operating position and thus synchronize the command to the vacuum arrangement 102 to remove air from within said support 7 according to the sequence above described for the various alternative embodiments. As explained in the above description the vacuum pump 102 is preferably activated also before the perforating units have actually pierced the support wall.

The control unit may comprise a digital processor (CPU) with memory (or memories), an analogical type circuit, or a combination of one or more digital processing units with one or more analogical processing circuits. In the present description and in the claims it is indicated that the control unit is "configured" or "programmed" to execute certain steps: this may be achieved in practice by any means which allow configuring or programming the control unit. For instance, in case of a control unit comprising one or more CPUs, one or more programs are stored in an appropriate memory: the program or programs containing instructions which, when executed by the control unit, cause the control unit to execute the steps described and/or claimed in connection with the control unit. Alternatively, if the control unit is of an analogical type, then the circuitry of the control unit is designed to include circuitry configured, in use, to process electric signals such as to execute the control unit steps herein disclosed.

The Vacuum Skin Package

The apparatuses and processes described above may be suitable for making a vacuum skin package hosting at least one product, as described in this section and as claimed in any one of the attached claims relating to a 'vacuum skin package'. An example of this type of package is shown in FIG. 20. This package may be obtained using any one of the trays or supports of the type above described, for instance the trays shown in figures from 13 to 20.

Figure 21A:
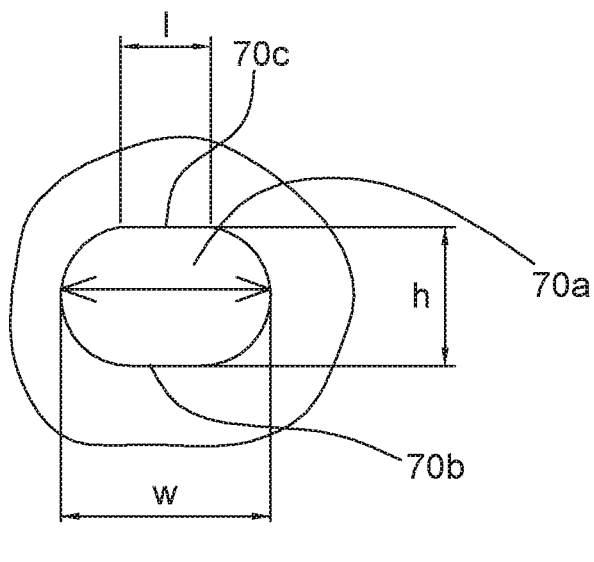
FIGS. 21a to 21d are enlarged and schematic views of the area of the side wall of a tray interested by a hole and a flap element according to aspects of the invention.
Figure 21B:
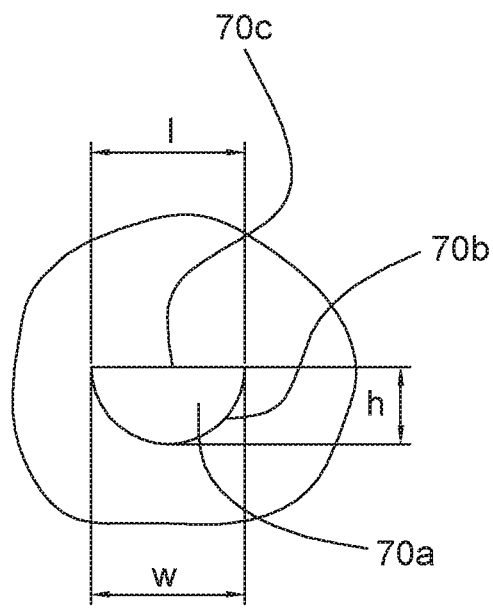
Figure 21C:
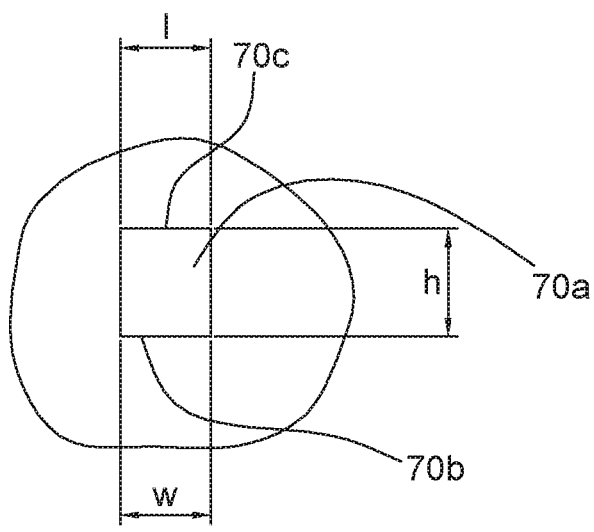
Figure 21D:
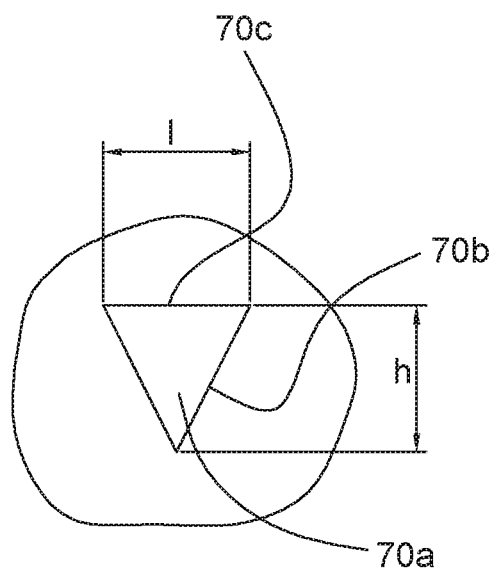

The innovative vacuum skin package 700 comprises a tray 701 presenting a bottom wall 702, which may be circular, oval, or polygonal, optionally rectangular, in shape, and a side wall 703 upwardly extending from the bottom wall and having a top rim 704, which is outwardly directed and serves as an abutment for a sealing film 705. The sidewall presents at least one cutout 70, which basically defines a passage or hole in the side wall of the tray, with a correspondingly associated flap element 70a, which is connected to the tray side wall: in particular, before application of film 705, the flap element 70a is positionable at least in an open position, where the flap element is inclined with respect to the tray wall (see dashed line in FIG. 20) and leaves a hole 70 in the side wall (either at horizontal or vertical or inclined portions of the side wall) to allow passage of fluid there through. The flap element can also be positioned in a closure position, where the flap element is aligned to the tray side wall and substantially closes said hole. One or more products 706 are loaded on the tray, and the film 705 is draped over the product(s) and welded to the upper rim 704 and to an inner surface portion of the tray. As shown in FIG. 20 a portion of the film keeps the flap element 70a in the closure position and tightly closes the at least one hole in the side wall; in the closure position, the flap element 70a is perfectly flush with respect to the side wall outer surface, thereby improving aesthetic appearance of the package. In the example of FIG. 20 the flap element 70a is integral with the sidewall and delimited by an open cutting line 70b, for instance obtained using the perforating unit 100 of the apparatus 1 described above; the flap element 70a is connected to the sidewall by a hinge line 70c (represented in dashed line in the figures) extending between ends of said cutting line: in practice the flap element 70a is a cutout portion of the side wall 703 which remains connected to, and integral with, the side wall via the hinge line 70c which defines a flexure line around which the flap element can rotate and move between said open and closed positions. The open cutting line 70b typically takes a regular shape such as that of a polygonal line or of an arc, e.g. arc of circle or arc of ellipse or combination of segments and arcs. For best operation of the flap element, the flap element should fulfill certain geometrical requirements: the hinge line length is not greater than the maximum width 'w' of the flap element measured parallel to the hinge line (see for instance FIGS. 21a and 21b which represent enlarged views of areas of the side wall interested by the flap element). In FIGS. 21b, 21c, 21d, the and "w' are basically of a same length. In any case, hinge line which is always shorter or equal to 'w' may not be too small compared to 'w': for instance, should not be smaller than 0.2 (⅕) of 'w'. Furthermore, the height 'h' of the flap element—measured perpendicular to the hinge line (see again figures e.g. 21a and 21b) is preferably greater than 0.2 (⅕) optionally greater than 0.5 (½) of the length 'l', but preferably smaller than 3 times 'l'. The above relative proportions may avoid excessive and uncontrolled curling of the flap element and at the same time ensure ability of the flap element to return in a closed position.

As mentioned, the side wall upwardly terminates in an outwardly projecting horizontal rim 704, with the film sheet 61 being welded to the top surface of said horizontal rim and to at least a portion of the inner surface of the side wall (see again FIG. 20), such as to keep stably in closed position the flap element and to warrant perfect tightness in correspondence of holes 70.

Furthermore, according to another aspect, the hole(s) is/are located in correspondence of corner(s) of the side wall, when this latter has a polygonal base. The side wall 703 may comprise one or more horizontal ledges 707 preferably present in the upper half of the side wall area: in this case, each horizontal ledge 707 may be located in correspondence of one respective of said corners. In the example of FIGS. 16-19*b* each of said horizontal ledges 707 has substantially the shape of a right-angle triangle when seen from a top view; moreover the sidewall presents vertical and mutually perpendicular facets emerging from converging orthogonal edges of each of said horizontal ledges, such as to define a region having 3 mutually converging perpendicular surfaces located in the corner regions where one or more of said holes and corresponding flap elements may be conveniently located. In particular, each hole may be located in correspondence of a respective corner in the form of an aperture through the side wall portion defining the horizontal ledge or one of said vertical facets (see FIGS. 19*c* and 19*d*).

In one embodiment, at an inner edge of each horizontal ledge, i.e. on the side of the horizontal ledge facing the inside of the tray, the tray side wall may also present a protecting protuberance 709, such as a substantially upwardly directed rim; as it is for instance visible from FIG. 19*b* each horizontal ledge 707 is vertically positioned at a lower height compared to said outwardly projecting horizontal rim 704 (which is the top rim of the tray) and horizontally extends between said protuberance 709 and a further side wall portion departing from the horizontal ledge and terminating at said horizontal rim. In this way, the horizontal ledges may be positioned at a relatively lower area of the side wall, while keeping the ledges free from contamination coming from the product thanks to the protecting protuberance. Note that that the just described aspect concerning the protecting protuberance 709 and the corresponding horizontal ledge 707 is independent from the shape (when seen from a top view) of the horizontal ledge and may be present also in cases where the corner is not forming three facets as described above and/or is not defining a triangular ledge 707.

Furthermore, as shown in FIGS. 17*a*, 17*b*, 18*a*, 18*b*, 19*a*, 19*b* 19*c* 19*d* the horizontal ledges 707 may be vertically positioned either at the same height or closer to the tray bottom compared to the position of further horizontal features 708 (also preferably located at corner regions) serving as abutments during tray stacking (also referred to as de-nesting features).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

What is claimed is:

1. A package comprising:
    a tray including:
        a bottom wall,
        a side wall upwardly extending from the bottom wall, the side wall upwardly terminating in an outwardly projecting horizontal rim, and the side wall comprising a horizontal ledge located at an upper half of the side wall, and
        a hole located in the horizontal ledge;
    wherein the side wall comprises a protuberance located at an inner edge of the horizontal ledge, the horizontal ledge being vertically positioned at a lower height of the side wall compared to the respective height of each of the outwardly projecting horizontal rim and the protuberance, and the horizontal ledge extending between the protuberance and a further side wall portion departing from the horizontal ledge and terminating at the horizontal rim.

2. The package of claim 1, wherein the horizontal ledge is positioned at a lower height compared to a top of the protuberance.

3. The package of claim 1, wherein the bottom wall is of polygonal shape and the side wall has a number of corners, and wherein the horizontal ledge is located in correspondence of one of the corners.

4. The package of claim 1, wherein a shape of the horizontal ledge is substantially a right-angle triangle, and wherein vertical and mutually perpendicular facets emerge from converging orthogonal edges of the horizontal ledge.

5. The package of claim 1, wherein the side wall has a flap element connected to the side wall, wherein the flap element is positioned in correspondence of the hole, further wherein, when the flap element is not constrained by plastic film coupled to the tray, the flap element is configured to be movable between an open position, where the flap element leaves the hole at least partially open, and a closed position, where the flap element is aligned to the side wall and substantially closes the hole.

6. The package of claim 5, wherein the flap element is integral with the side wall and delimited by an open cutting line, the flap element being connected to the side wall by a hinge line extending between ends of the cutting line, the flap element being configured to move between the open and closed positions by pivoting around the hinge line.

7. The package of claim 6, wherein:
    a length of the hinge line is not greater than a maximum width of the flap element measured parallel to the hinge line;
    the length of the hinge line is greater than 0.2 times the maximum width; and
    a height of the flap element, measured perpendicular to the hinge line, has one or more of the following properties:
        the height is greater than 0.2 times the length of the hinge line,
        the height is greater than 0.5 times the length of the hinge line,
        the height is smaller than 3 times the length of the hinge line.

8. The package of claim 5, wherein the bottom wall is of polygonal shape and the side wall includes a number of corners, the horizontal ledge being located in correspondence of one of the corners, the hole forming at least one of an aperture through the side wall portion defining the horizontal ledge or an aperture through one of mutually perpendicular facets emerging from edges of the horizontal ledge.

9. The package of claim 5, further comprising:
    a product loaded on the tray; and a plastic film draped over the product and welded to a portion of an inner surface of the tray which is not in contact with the product, wherein a portion of the plastic film adheres to the flap element and constrains the flap element in fixed closed position relative to the side wall, wherein the flap element in the fixed closed position matches a contour of the hole and remains flush with respect to a surface of the side wall, with the plastic film tightly closing the hole.

10. The package of claim 9, wherein the plastic film is also welded to a top surface of the horizontal rim.

11. The package of claim 9, wherein the plastic film forms a skin in contact with the product and with the portion of the inner surface of the tray which is not in contact with the product.

12. A vacuum skin package comprising:
 a tray according to claim 1;
 a product loaded on the bottom wall of the tray; and
 a film draped over the product and welded to the outwardly projecting horizontal rim.

13. A method, comprising:
providing a tray, the tray including:
 a bottom wall, and
 a side wall upwardly extending from the bottom wall, the side wall upwardly terminating in an outwardly projecting horizontal rim, and the side wall comprising a horizontal ledge located at an upper half of the side wall,
 wherein the side wall comprises a protuberance located at an inner edge of the horizontal ledge, the horizontal ledge being vertically positioned at a lower height of the side wall compared to the respective height of each of the outwardly projecting horizontal rim and the protuberance, the horizontal ledge extending between the protuberance and a further side wall portion departing from the horizontal ledge and terminating at the horizontal rim;
forming a hole in the horizontal ledge of the tray.

* * * * *